United States Patent
Liu et al.

(10) Patent No.: US 11,563,404 B2
(45) Date of Patent: Jan. 24, 2023

(54) INTENSITY OF CURRENT-VOLTAGE CURVE SCANNING METHOD FOR PHOTOVOLTAIC STRING, CONVERTER, AND SYSTEM

(71) Applicant: HUAWEI TECHNOLOGIES CO., LTD., Guangdong (CN)

(72) Inventors: Fangcheng Liu, Shanghai (CN); Kai Xin, Shanghai (CN); Xinyu Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 17/035,142

(22) Filed: Sep. 28, 2020

(65) Prior Publication Data

US 2021/0058030 A1  Feb. 25, 2021

Related U.S. Application Data

(63) Continuation of application No. PCT/CN2019/084493, filed on Apr. 26, 2019.

(30) Foreign Application Priority Data

Nov. 7, 2018  (CN) .......................... 201811320167.0

(51) Int. Cl.
  *H02S 50/00* (2014.01)
  *H02S 40/32* (2014.01)
(52) U.S. Cl.
  CPC .............. *H02S 50/00* (2013.01); *H02S 40/32* (2014.12)
(58) Field of Classification Search
  None
  See application file for complete search history.

(56) References Cited

U.S. PATENT DOCUMENTS

| 2012/0160295 A1 | 6/2012 | Clevenger et al. |
| 2013/0257155 A1 | 10/2013 | Judkins et al. |
| 2014/0077608 A1 | 3/2014 | Nosaka et al. |

FOREIGN PATENT DOCUMENTS

| CN | 104022734 A | 9/2014 |
| CN | 106712716 A | 5/2017 |

(Continued)

OTHER PUBLICATIONS

Extended European Search Report issued in European Application No. 19882298.3 dated Feb. 5, 20201, 6 pages.

(Continued)

*Primary Examiner* — Shannon M Gardner
(74) *Attorney, Agent, or Firm* — Fish & Richardson P.C.

(57) ABSTRACT

One example method includes obtaining output powers at initial scanning points of photovoltaic strings in a first group and a second group. The output powers at the initial scan points of the photovoltaic strings in the first group can then be controlled to sequentially decrease, and the output powers at the initial scan points of the photovoltaic strings in the second group can then be controlled to sequentially increase. Scanning can then be performed in the initial scanning direction starting from output voltages corresponding to the output powers at the initial scan points of the first group. Scanning can then be performed in the initial scanning direction starting from output voltages corresponding to the output powers at the initial scan points of the second group, where output powers of the first group and the second group are kept to compensate each other during IV curve scanning.

9 Claims, 17 Drawing Sheets

(56) References Cited

FOREIGN PATENT DOCUMENTS

| CN | 107017836 A | 8/2017 |
|---|---|---|
| CN | 107196604 A | 9/2017 |
| CN | 108418549 A | 8/2018 |
| EP | 3361631 A1 | 8/2018 |
| WO | 2017016726 A1 | 2/2017 |

OTHER PUBLICATIONS

PCT International Search Report and Written Opinion issued in International Application No. PCT/CN2019/084493 dated Aug. 9, 2019, 11 pages (partial English translation).
Office Action issued in Chinese Application No. 201811320167.0 dated Oct. 25, 2022, 4 pages.

INTENSITY OF CURRENT-VOLTAGE CURVE SCANNING METHOD FOR PHOTOVOLTAIC STRING, CONVERTER, AND SYSTEM

This application is a continuation of International Patent Application No. PCT/CN2019/084493, filed on Apr. 26, 2019, which claims priority to Chinese Patent Application No. 201811320167.0, filed with the Chinese Patent Office on Nov. 7, 2018. The entire contents of both applications are incorporated herein by reference in their entirety.

TECHNICAL FIELD

The present invention relates to the field of power electronics technologies, and in particular, to a current-voltage curve scanning method for a photovoltaic string, a converter, and a system.

BACKGROUND

With continuous promotion of energy conservation, emission reduction, and energy transformation in countries around the world, renewable energy power generation technologies have attracted increasing attention. Among the technologies, a photovoltaic power generation system is widely applied to a power system and a micro power grid due to factors such as technology maturity and economic efficiency thereof.

Referring to FIG. 1, FIG. 1 is a schematic diagram of a typical photovoltaic power generation system.

A photovoltaic string 100 converts solar energy into electric energy by using a photovoltaic effect, and a converter 200 converts the electric energy output by the photovoltaic string 100 into an appropriate alternating current or direct current and supplies the current to a power grid or load 300.

In actual application, the photovoltaic string 100 usually includes a plurality of photovoltaic modules (also referred to as solar panels) connected in series and in parallel, to match a rated voltage and a rated current that are required by a system.

It can be learned from FIG. 1 that in the photovoltaic power generation system, the photovoltaic string 100 is a source of electric energy. Therefore, a working status of the photovoltaic string 100 determines a maximum power generation capability of the photovoltaic power generation system. Usually, a current-voltage (IV) curve output by the photovoltaic string 100 is used as an indicator for evaluating a power generation capability of the photovoltaic string 100.

FIG. 2 is a curve diagram of an output characteristic of a photovoltaic string.

In a normal case, the output characteristic of the photovoltaic string is indicated by solid lines in FIG. 2. The solid lines include an IV curve and a power-voltage (PV) curve, and both curves are comparatively smooth. A horizontal coordinate of the IV curve represents a voltage, and a vertical coordinate of the IV curve represents a current, where a maximum voltage is an open-circuit voltage $V_{oc}$, and a maximum current is a short-circuit current $I_{sc}$. A horizontal coordinate of the PV curve represents a voltage, and a vertical coordinate of the PV curve represents a power, where a maximum power is $P_{max}$.

In actual application, because the photovoltaic string is exposed outdoors, there is a potential fault such as blocking, aging, or corrosion, and a power generation capability of the photovoltaic string is affected by a fault. In this case, the output characteristic of the photovoltaic string is indicated by dashed lines in FIG. 2. Both an IV curve in this case and a corresponding PV curve deviate from the curves indicated by the solid lines, and a peak power is far less than $P_{max}$, that is, the power generation capability is impaired.

It can be learned from a comparison in FIG. 2 that a fault of the photovoltaic string directly affects a power generation capability of the photovoltaic power generation system. Therefore, obtaining the output characteristic, especially IV curve information, of the photovoltaic string in a timely and rapid manner helps find and locate an unexpected working status of the photovoltaic string as early as possible, provide a reference for operation and maintenance of the photovoltaic power generation system, and reduce a power generation loss caused by a fault of the photovoltaic string.

In the prior art, IV curve scanning is implemented in a manner in which a person carries a measurement device to a photovoltaic string site to perform measurement. However, a power station includes a huge quantity of photovoltaic strings. Therefore, the manual measurement manner consumes quite a long time, and is excessively inefficient.

In addition, IV curve scanning may be performed on photovoltaic strings at a power station in batches. However, scanning in batches causes a scan time interval. Besides, the photovoltaic strings convert solar energy into electric energy. Therefore, when measurement is performed in batches, a weather environment affects detection precision.

SUMMARY

To resolve the foregoing technical problem existing in the prior art, the present invention provides a string inverter control method, an apparatus, a controller, and an inverter system, so as to enable IV curve scanning to be performed simultaneously on all photovoltaic strings at a power station. There is no scan time interval, and therefore, a weather environment does not have an impact.

An embodiment of this application provides a current-voltage curve scanning method for a photovoltaic string, where the method is applied to a converter in a photovoltaic power generation system, an input end of each converter is connected to one photovoltaic string, the converter is configured to control an output voltage of the connected photovoltaic string; and the method includes:

obtaining output powers at initial scan points of photovoltaic strings in the first group, and obtaining output powers at initial scan points of photovoltaic strings in the second group;

controlling the output powers at the initial scan points of the photovoltaic strings in the first group to sequentially decrease, and controlling the output powers at the initial scan points of the photovoltaic strings in the second group to sequentially increase, where an initial scan direction of each photovoltaic string in the first group is a direction in which an output voltage changes as an output power decreases, and an initial scan direction of each photovoltaic string in the second group is a direction in which an output voltage changes as an output power increases; and performing current-voltage IV curve scanning on the first group in the initial scan direction of the first group starting from output voltages corresponding to the output powers at the initial scan points of the first group, and performing current-voltage IV curve scanning on the second group in the initial scan direction of the second group starting from output voltages corresponding to the output powers at the initial scan points of the second group, where output powers of the first group and the second group are kept to compensate each other during IV curve scanning.

This method can enable IV curve scanning to be performed simultaneously on all photovoltaic strings in a photovoltaic power generation system, and IV curve scanning does not need to be performed in batches. Therefore, there is no time interval between IV curve scanning performed on different photovoltaic strings, and further there is no measurement error caused by a time interval. In addition, photovoltaic strings are grouped and paired for IV curve scanning. It can be ensured that a total output power of the photovoltaic power generation system fluctuates slightly, provided that it is ensured that powers of two groups in a pair compensate each other, that is, a fluctuation within the pair is comparatively small.

In a possible implementation. IV curve scanning needs to be performed for a complete cycle, and therefore, the method further includes: when an output voltage of each photovoltaic string is equal to an open-circuit voltage during IV curve scanning, changing a scan direction to a direction in which the output voltage decreases; when the output voltage of each photovoltaic string is equal to a short-circuit voltage during IV curve scanning, changing the scan direction to a direction in which the output voltage increases; and when the output voltage of each photovoltaic string is the same as the output voltage corresponding to the initial scan point and the scan direction is the same as the initial scan direction, ending IV curve scanning. The performing IV curve scanning specifically includes: gradually changing the output voltage of the photovoltaic string, recording an output current corresponding to each output voltage, and obtaining an IV curve based on the output voltage and the corresponding output current.

In a possible implementation, a scan voltage may be fixed. To be specific, when a voltage change rate is fixed, the gradually changing the output voltage of the photovoltaic string is specifically: gradually changing the output voltage of the photovoltaic string by a fixed voltage scan step within each IV curve scan interval, where the IV curve scan interval includes a voltage interval between the open-circuit voltage and a voltage corresponding to a maximum power of the photovoltaic string, and a voltage interval between the short-circuit voltage and the voltage corresponding to the maximum power of the photovoltaic string.

In a possible implementation, to better implement scanning and make the output powers of the two groups better compensate each other, a scan voltage may be changed. To be specific, a voltage change rate is not fixed. One group may be used as a reference group, and a scan voltage may be changed for the other group. For example, the second group is used as the reference group, and the gradually changing the output voltage of the photovoltaic string is specifically:

comparing a total output power $P_o$ of the first group and the second group with a specified power reference value $P_{ref}$ to obtain a power comparison result, where $P_{ref}$ is equal to $XP_{max}$, X is a quantity of photovoltaic strings in the reference group, and $P_{max}$ is a maximum power of a single photovoltaic string in the reference group; and adjusting a voltage scan step based on the power comparison result to change the output voltage of the photovoltaic string, to enable $P_o$ to keep consistent with $P_{ref}$.

In a possible implementation, the adjusting a voltage scan step based on the power comparison result to change the output voltage of the photovoltaic string specifically includes:

when $P_o$ is greater than $P_{ref}$, if it is determined that a power change direction of each photovoltaic string in the first group is an increasing direction, decreasing a voltage scan step of each photovoltaic string in the first group, or if the power change direction is a decreasing direction, increasing a voltage scan step of each photovoltaic string in the first group;

when $P_o$ is less than $P_{ref}$, if it is determined that a power change direction of each photovoltaic string in the first group is an increasing direction, increasing a voltage scan step of each photovoltaic string in the first group, or if the power change direction is a decreasing direction, decreasing a voltage scan step of each photovoltaic string in the first group; or when $P_o$ is equal to $P_{ref}$, keeping a voltage scan step of each photovoltaic string in the first group unchanged.

In a possible implementation, the photovoltaic power generation system includes 2N photovoltaic strings, the 2N photovoltaic strings are divided into the first group and the second group, and each the first group and the second group includes N photovoltaic strings. That is, the 2N photovoltaic strings are evenly divided into two groups in a simple manner.

In a possible implementation, the obtaining output powers at initial scan points of photovoltaic strings in the first group, and obtaining output powers at initial scan points of photovoltaic strings in the second group is specifically:

obtaining the output powers that are at the initial scan points of the photovoltaic strings in the first group and that are $P_{max}$, $$\frac{(N-1)P_{max}}{N}, \ldots, \text{ and } \frac{P_{max}}{N},$$

and obtaining the output powers that are at the initial scan points of the photovoltaic strings in the second group and that are 0, $$\frac{P_{max}}{N}, \ldots, \text{ and } \frac{(N-1)P_{max}}{N},$$

where $P_{max}$ is a maximum output power corresponding to each photovoltaic string.

In a possible implementation, the photovoltaic power generation system includes an even quantity of photovoltaic strings, the even quantity of photovoltaic strings are divided into M sets, and each set is divided into an even quantity of groups.

In a possible implementation, the photovoltaic power generation system includes an even quantity of photovoltaic strings, the even quantity of photovoltaic strings are divided into M sets, some of the sets are divided into subsets, each subset is divided into an even quantity of groups, and each of the remaining sets is divided into an even quantity of groups.

An embodiment of this application provides a converter, where an input end of each converter is connected to one photovoltaic string, and the converter is configured to control an output voltage of the connected photovoltaic string; the photovoltaic string includes a first group and a second group; and the first group corresponds to a first converter, and the second group corresponds to a second converter; where the first converter is configured to: obtain output powers at initial scan points of photovoltaic strings in the first group; control the output powers at the initial scan points of the photovoltaic strings in the first group to sequentially decrease; and perform current-voltage IV curve scanning on the first group in an initial scan direction of the first group starting from output voltages corresponding to the output powers at the initial scan points of the first group; and the second converter is configured to: obtain output powers at initial scan points of photovoltaic strings in the second group; control the output powers at the initial scan points of the photovoltaic strings in the second group to sequentially increase; and perform current-voltage IV curve scanning on the second group in an initial scan direction of the second group starting from output voltages corresponding to the output powers at the initial scan points of the second group, where output powers of the first group and the second group are kept to compensate each other during IV curve scanning.

In a possible implementation, the first converter and the second converter are further configured to: when an output voltage of each photovoltaic string is equal to an open-circuit voltage during IV curve scanning, change a scan direction to a direction in which the output voltage decreases; when the output voltage of each photovoltaic string is equal to a short-circuit voltage during IV curve scanning, change the scan direction to a direction in which the output voltage increases; and when the output voltage of each photovoltaic string is the same as the output voltage corresponding to the initial scan point and the scan direction is the same as the initial scan direction, end IV curve scanning; and the performing, by the first converter and the second converter, IV curve scanning specifically includes:

gradually changing the output voltage of the photovoltaic string, recording an output current corresponding to each output voltage, and obtaining an IV curve based on the output voltage and the corresponding output current.

In a possible implementation, the gradually changing, by the first converter and the second converter, the output voltage of the photovoltaic string is specifically: gradually changing the output voltage of the photovoltaic string by a fixed voltage scan step within each IV curve scan interval, where the IV curve scan interval includes a voltage interval between the open-circuit voltage and a voltage corresponding to a maximum power of the photovoltaic string, and a voltage interval between the short-circuit voltage and the voltage corresponding to the maximum power of the photovoltaic string.

In a possible implementation, the second group is used as a reference group, and the gradually changing, by the first converter, the output voltage of the photovoltaic string is specifically:

comparing a total output power $P_o$ of the first group and the second group with a specified power reference value $P_{ref}$ to obtain a power comparison result, where $P_{ref}$ is equal to $XP_{max}$, X is a quantity of photovoltaic strings in the reference group, and $P_{max}$ is a maximum power of a single photovoltaic string in the reference group; and adjusting a voltage scan step based on the power comparison result to change the output voltage of the photovoltaic string, to enable $P_o$ to keep consistent with $P_{ref}$.

In a possible implementation, the adjusting, by the first converter, a voltage scan step based on the power comparison result to change the output voltage of the photovoltaic string specifically includes:

when $P_o$ is greater than $P_{ref}$, if it is determined that a power change direction of each photovoltaic string in the first group is an increasing direction, decreasing a voltage scan step of each photovoltaic string in the first group, or if the power change direction is a decreasing direction, increasing a voltage scan step of each photovoltaic string in the first group;

when $P_o$ is less than $P_{ref}$, if it is determined that a power change direction of each photovoltaic string in the first group is an increasing direction, increasing a voltage scan step of each photovoltaic string in the first group, or if the power change direction is a decreasing direction, decreasing a voltage scan step of each photovoltaic string in the first group; or when $P_o$ is equal to $P_{ref}$, keeping a voltage scan step of each photovoltaic string in the first group unchanged.

In a possible implementation, the photovoltaic power generation system includes an even quantity of photovoltaic strings, the even quantity of photovoltaic strings are 2N photovoltaic strings, the 2N photovoltaic strings are divided into the first group and the second group, and each of the first group and the second group includes N photovoltaic strings.

In a possible implementation, the first converter obtains the output powers that are at the initial scan points of the photovoltaic strings in the first group and that are $P_{max}$, $$\frac{(N-1)P_{max}}{N}, \ldots, \text{and } \frac{P_{max}}{N};$$

and the second converter obtains the output powers that are at the initial scan points of the photovoltaic strings in the second group and that are 0, $$\frac{P_{max}}{N}, \ldots, \text{and } \frac{(N-1)P_{max}}{N},$$

where $P_{max}$ is a maximum output power corresponding to each photovoltaic string.

In a possible implementation, both the first converter and the second converter are any one of the following:

a direct current-direct current converter and a direct current-alternating current converter.

An embodiment of this application further provides a photovoltaic power generation system, including the foregoing converter and further including a photovoltaic string, where the photovoltaic string is configured to convert solar energy into direct-current electric energy; and the converter is configured to perform electric energy conversion on the direct-current electric energy and transmit the converted direct-current electric energy to a downstream device.

Compared with the prior art, the present invention has at least the following advantages:

A photovoltaic string includes the following two groups: a first group and a second group. IV curve scanning may be performed simultaneously on photovoltaic strings in each of the two groups, but the two groups of photovoltaic strings have different scan start points, that is, different initial scan points, and the two groups of photovoltaic strings also have different initial scan directions. Output powers at initial scan points of photovoltaic strings in the first group sequentially decrease, and output powers at initial scan points of photovoltaic strings in the second group sequentially increase. In addition, an initial scan direction of the first group is a direction in which an output voltage changes as an output power decreases, and an initial scan direction of the second group is a direction in which an output voltage changes as an output power increases. Such setting is to ensure that output powers of the two groups compensate each other during IV curve scanning performed on the two groups of photovoltaic strings, that is, a total output power fluctuates slightly. This can enable an entire photovoltaic power generation system to be in a stable working status.

The foregoing technical solutions can enable IV curve scanning to be performed simultaneously on all photovoltaic strings in a photovoltaic power generation system, and IV curve scanning does not need to be performed in batches. Therefore, there is no time interval between IV curve scanning performed on different photovoltaic strings, and further there is no measurement error caused by a time interval. In addition, photovoltaic strings are grouped and paired for IV curve scanning. It can be ensured that a total output power of the photovoltaic power generation system fluctuates slightly, provided that it is ensured that powers of two groups in a pair compensate each other, that is, a fluctuation within the pair is comparatively small.

BRIEF DESCRIPTION OF DRAWINGS

To describe the technical solutions in the embodiments of this application or in the prior art more clearly, the following briefly describes the accompanying drawings for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

To enable a person skilled in the art to better understand the technical solutions provided in the embodiments of this application, the following first describes an implementation of performing IV curve scanning by using a converter.

A specific form of the converter is not limited in the embodiments of this application. The converter may be a direct current-direct current converter, that is, a DC-DC converter, or may be an inverter, that is, a DC-AC converter.

An output end of the converter is connected to a photovoltaic string. The converter converts direct-current electric energy output by the photovoltaic string and transmits the converted direct-current electric energy to a downstream device.

Figure 1:
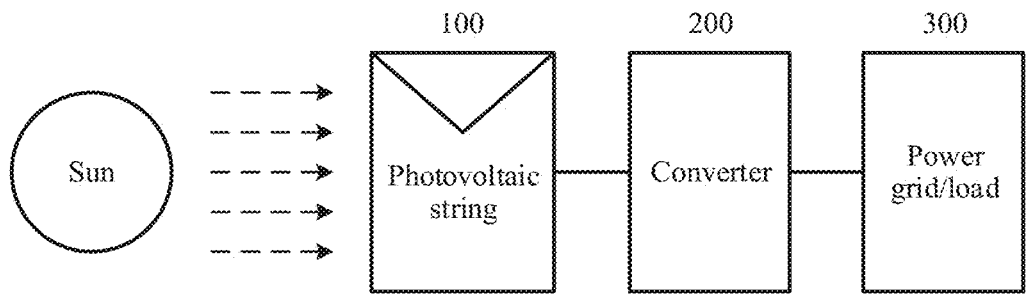
FIG. 1 is a schematic diagram of a typical photovoltaic power generation system.
Figure 2:
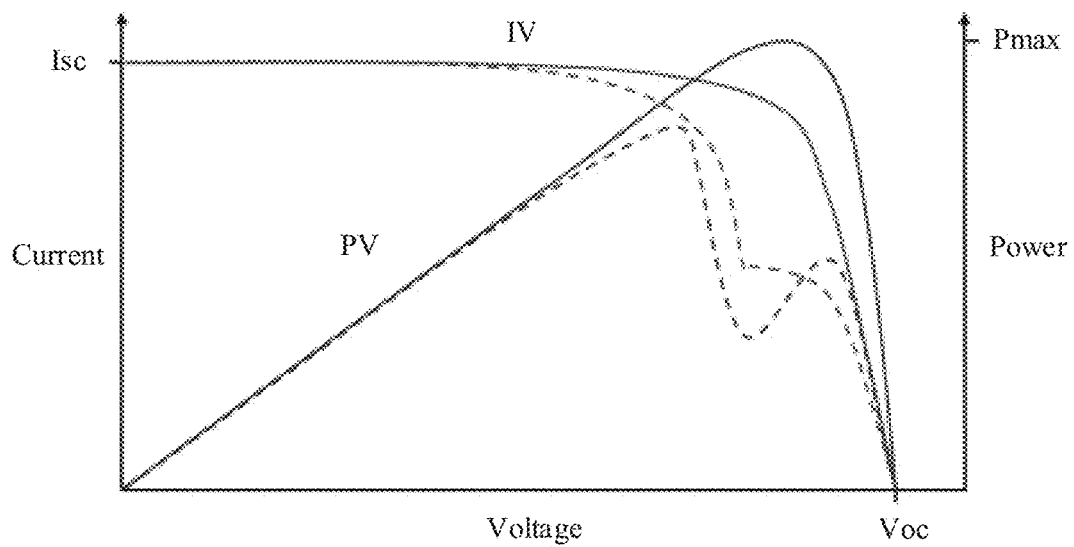
FIG. 2 is a curve diagram of an output characteristic of a photovoltaic string.
Figure 3:
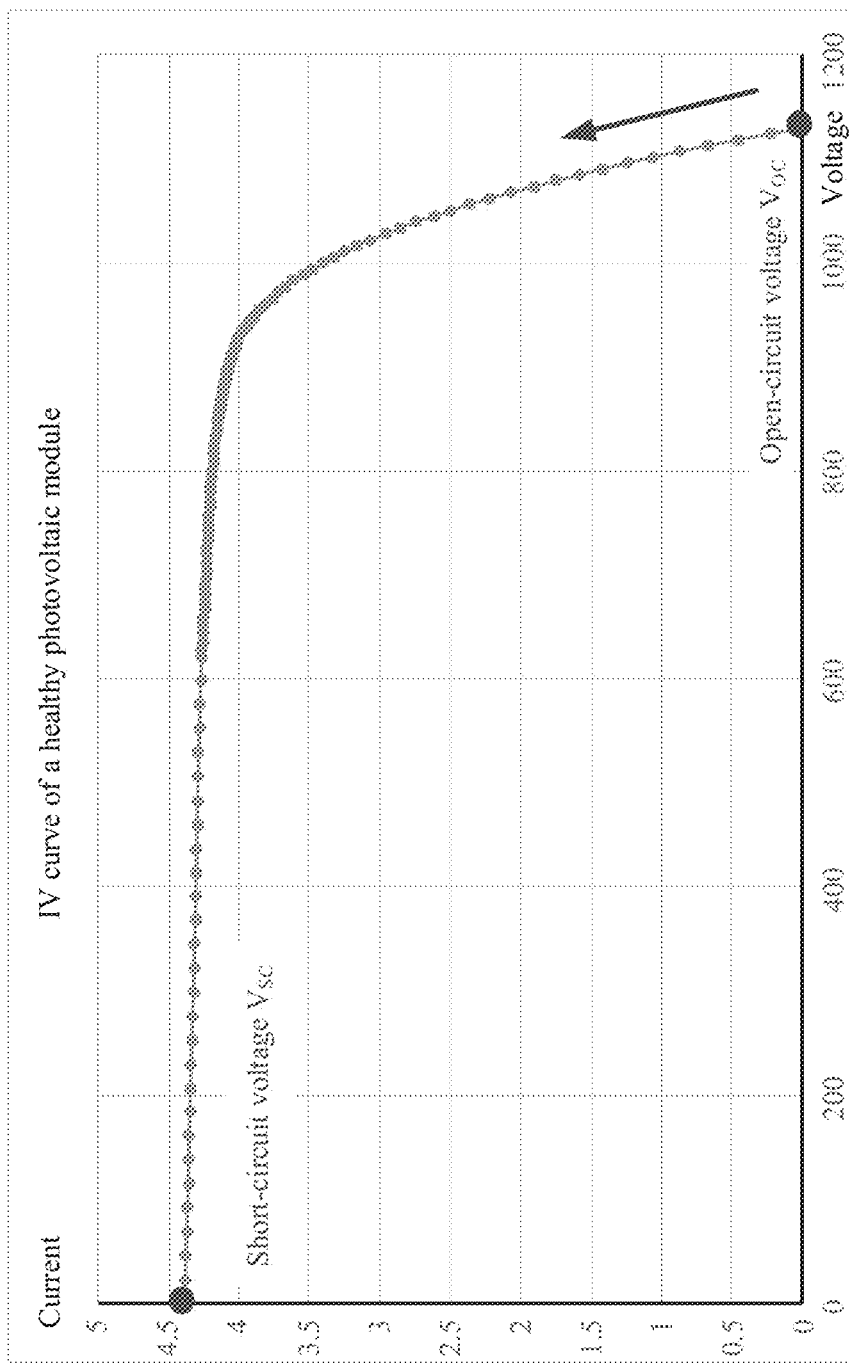
FIG. 3 is a schematic diagram of IV curve scanning by using a converter according to an embodiment of this application.

FIG. 3 is a schematic diagram of IV curve scanning by using a converter according to an embodiment of this application.

It can be learned from FIG. 3 that a horizontal axis represents an output voltage of a photovoltaic string, a vertical axis represents an output current of the photovoltaic string, a maximum output voltage is an open-circuit voltage $V_{oc}$, a maximum output current is a current corresponding to a short-circuit voltage, and the short-circuit voltage is a minimum output voltage $V_{sc}$.

A converter has a capability of controlling a photovoltaic string. For example, a converter controls an output voltage of a photovoltaic string to be maintained at an output voltage corresponding to a maximum power, so that the photovoltaic string can output a corresponding peak power.

Therefore, the converter may be used to change an operating voltage of the photovoltaic string, so that output currents corresponding to output voltages that correspond to different operating points are measured and recorded, and an IV curve is further obtained through fitting based on output voltages and output currents of a plurality of operating points.

In this embodiment of this application, IV curve scanning is performed in a manner of controlling the output voltage of the photovoltaic string by using the converter. Therefore, a connection manner of an output end of the converter is not limited in this embodiment of this application.

When the converter controls IV curve scanning to be performed on photovoltaic strings in batches, because there is a scan time interval between the batches, and the photovoltaic strings are easily affected by a weather environment factor, a scan error exists between different batches. As a result, a result of IV curve scanning is not precise enough.

According to a scanning method provided in the embodiments of this application, IV curve scanning can be performed simultaneously on all photovoltaic strings. The photovoltaic strings are divided into an even quantity of groups, every two groups are paired, and each pair uses a same control manner. For two groups in each pair, scanning starts at different initial scan points. Initial scan directions of the two groups are also different, and for the two groups, scanning is performed in opposite output power change directions. To be specific, scanning is performed for one group in a direction in which an output power increases, and scanning is performed for the other group in a direction in which an output power decreases. In this way the output powers of the two groups are kept to compensate each other during IV curve scanning and further a total output power of the two groups fluctuates as slightly as possible. The technical solutions can enable IV curve scanning to be performed simultaneously on all photovoltaic strings at a power station. There is no scan time interval, and therefore, a weather environment does not have an impact. Therefore, an obtained IV curve is comparatively precise.

The following describes in detail specific implementations provided in the embodiments of this application with reference to the accompanying drawings.

Embodiment 1

Figure 4:
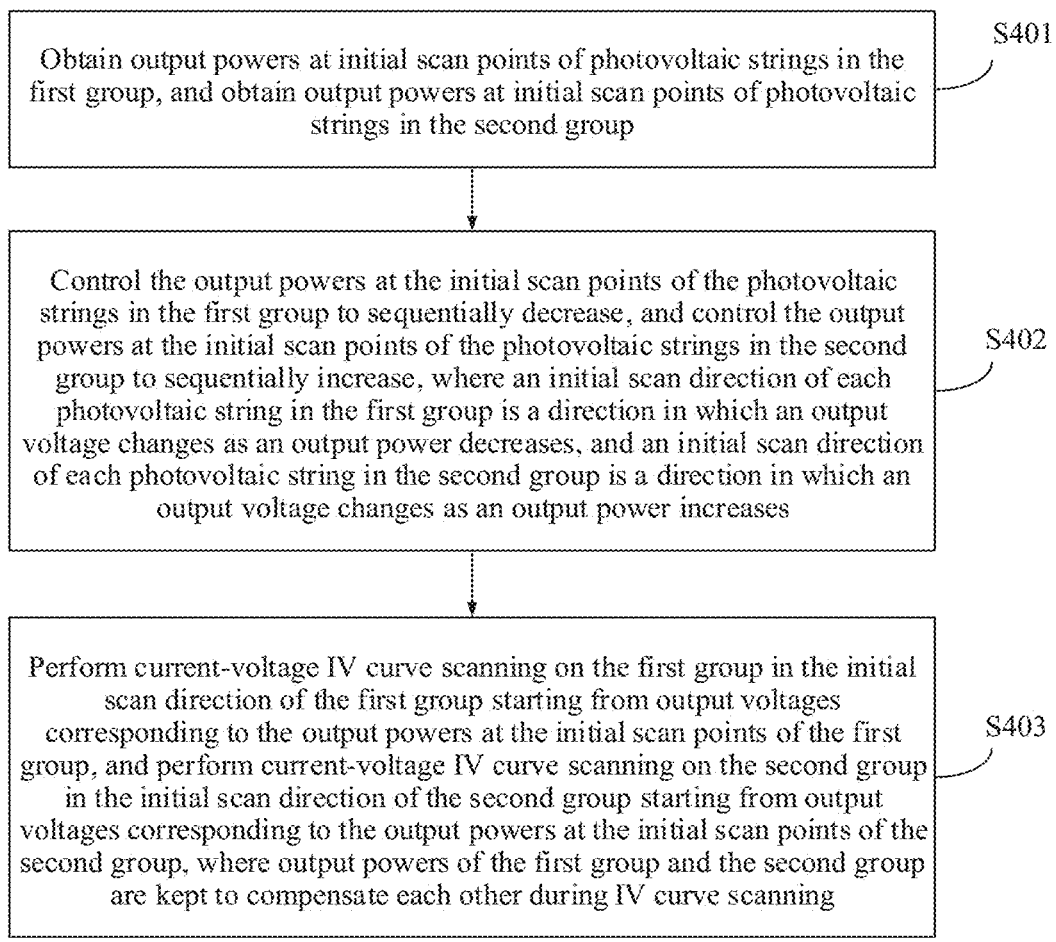
FIG. 4 is a flowchart of an IV curve scanning method according to an embodiment of this application.

FIG. 4 is a flowchart of an IV curve scanning method according to an embodiment of this application.

The current-voltage curve scanning method for a photovoltaic string provided in this embodiment is applied to a converter in a photovoltaic power generation system. An input end of each converter is connected to one photovoltaic string, and the converter is configured to control an output voltage of the connected photovoltaic string. The photovoltaic string includes a first group and a second group.

Figure 5:
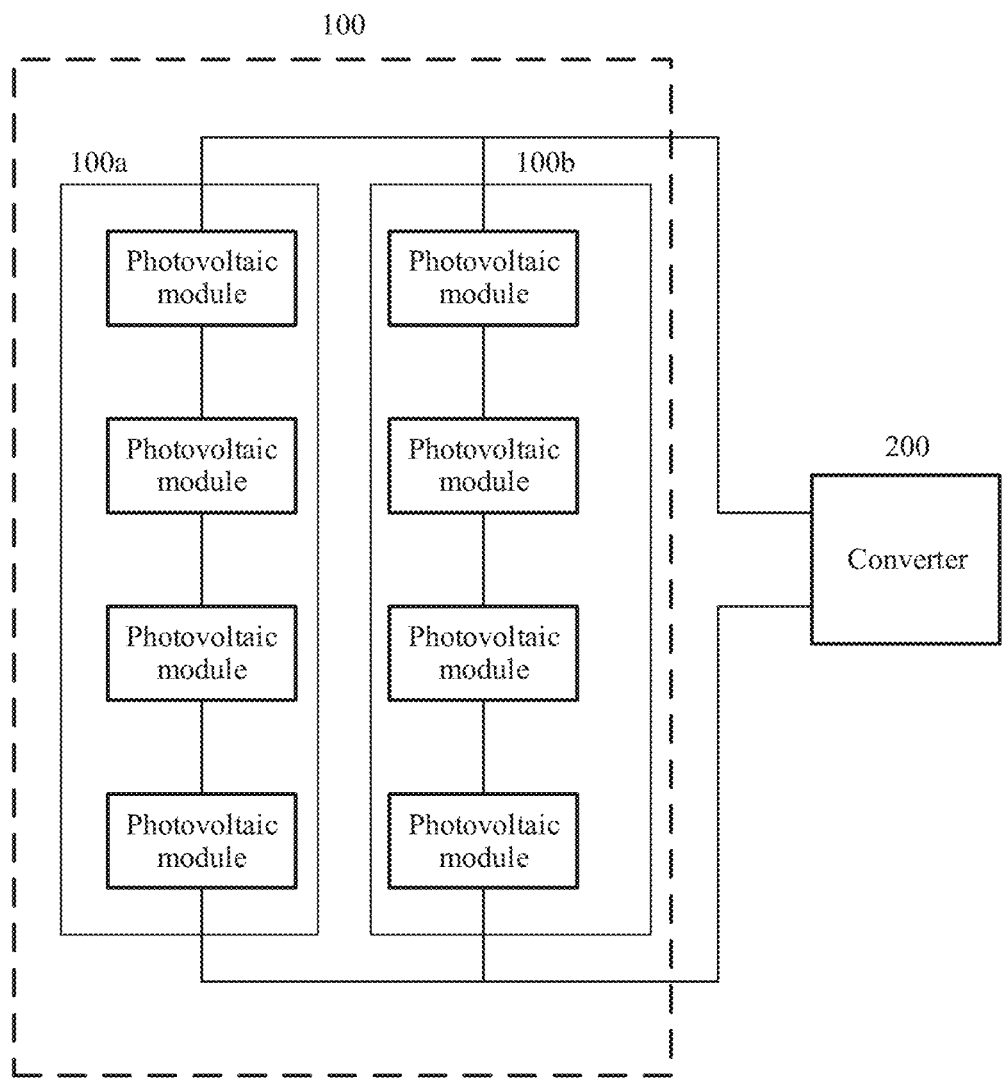
FIG. 5 is a schematic diagram of a plurality of photovoltaic strings that are connected in parallel according to an embodiment of this application.

The converter and the photovoltaic string are in a one-to-one relationship, including that the photovoltaic string connected to the input end of the converter is a single photovoltaic string, or the input end of the converter is connected to an equivalent string, where the equivalent string may be a plurality of photovoltaic strings connected in parallel. To be specific, if a plurality of photovoltaic strings are connected in parallel and then are connected as a whole to a same converter, the plurality of photovoltaic strings connected in parallel are equivalent to one photovoltaic string in this embodiment of this application. For details, refer to FIG. 5. A photovoltaic string 100 actually includes two photovoltaic strings (100a and 100b) that are connected in parallel and then are connected as a whole to a same converter 200. However, the converter 200 controls an output voltage of the photovoltaic string 100. Therefore, it is equivalent to that the converter 200 is connected to one photovoltaic string 100. It can be understood that in this embodiment of this application, a quantity of photovoltaic strings is equal to a quantity of converters. The converter may control the output voltage of the photovoltaic string, and further changes an output current of the photovoltaic string.

In actual application, one power station usually includes tens of thousands of photovoltaic strings. By using the technical solutions provided in this embodiment, IV curve scanning can be performed simultaneously on a huge quantity of photovoltaic strings. All the photovoltaic strings are divided into an even quantity of groups, every two groups are paired, and each pair is regarded as a unit during IV curve scanning. There may be a plurality of specific grouping manners, provided that photovoltaic strings are finally divided into an even quantity of groups for pairing and IV curve scanning. Each group may include one photovoltaic string, or may include a plurality of photovoltaic strings, but two paired groups should have a same quantity of photovoltaic strings. For example, each group includes three photovoltaic strings. However, different pairs may have a same quantity of photovoltaic strings or different quantities of photovoltaic strings. For example, two pairs are included, each group in a first pair includes three photovoltaic strings, and each group in a second pair includes two photovoltaic strings.

Because each pair operates in a same manner, the following description is based on that two groups in each pair are a first group and a second group.

The following method is performed on photovoltaic strings in the first group and the second group in each pair.

S401: Obtain output powers at initial scan points of photovoltaic strings in the first group, and obtain output powers at initial scan points of photovoltaic strings in the second group.

IV curve scanning needs to cover an entire output voltage range (between an open-circuit voltage and a short-circuit voltage). Therefore, when an output voltage changes, an output power of each photovoltaic string fluctuates. According to the solutions, IV curve scanning may be performed simultaneously on all strings. Therefore, to reduce a fluctuation of a total output power of a power station, output powers of two groups in each pair are made to compensate each other. In this way, a total output power of each pair is almost stable, and further the total output power of the power station is also almost stable. Specifically, in this embodiment, a change direction of the output powers at the initial scan points of the photovoltaic strings in the first group is made to be opposite to a change direction of the output powers at the initial scan points of the photovoltaic strings in the second group, so as to form mutual compensation.

S402: Control the output powers at the initial scan points of the photovoltaic strings in the first group to sequentially decrease, and control the output powers at the initial scan points of the photovoltaic strings in the second group to sequentially increase, where an initial scan direction of each photovoltaic string in the first group is a direction in which an output voltage changes as an output power decreases, and an initial scan direction of each photovoltaic string in the second group is a direction in which an output voltage changes as an output power increases.

Currently, when IV curve scanning is performed on photovoltaic strings at a power station in batches, for photovoltaic strings that undergo IV curve scanning in a same batch, scanning is performed from a same initial scan point and in a same initial scan direction. To be specific, when an output power of a photovoltaic string increases, output powers of other photovoltaic strings in the same batch also increase, and when an output power of a photovoltaic string decreases, output powers of other photovoltaic strings in the same batch also decrease.

The first group and the second group include a same quantity of photovoltaic strings. For ease of understanding of S401 and S402, the following uses an example in which each of the first group and the second group includes two photovoltaic strings for description. A control method is the same for a case in which another quantity of photovoltaic strings are included.

Figure 6:
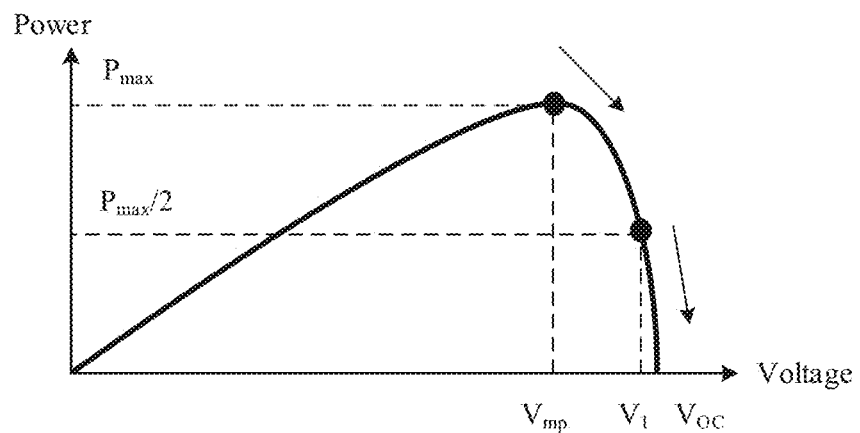
FIG. 6 is a schematic diagram of initial scan points and initial scan directions of two photovoltaic strings in a first group according to an embodiment of this application.
Figure 7:
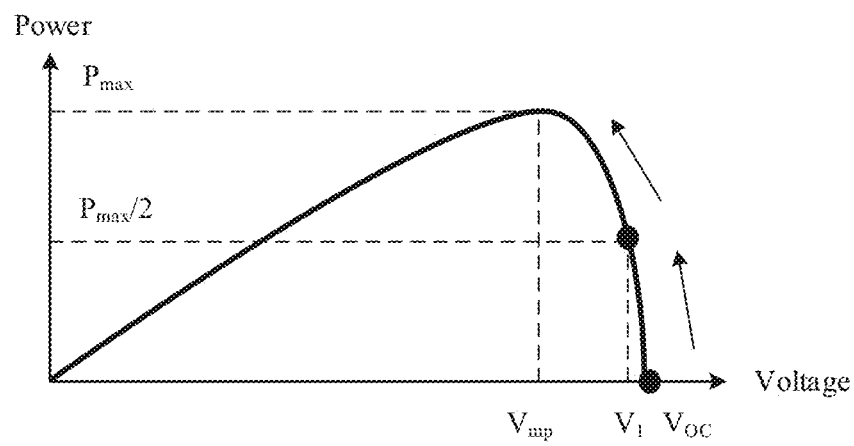
FIG. 7 is a schematic diagram of initial scan points and initial scan directions of two photovoltaic strings in a second group according to an embodiment of this application.

FIG. 6 is a schematic diagram of initial scan points and initial scan directions of two photovoltaic strings in a first group and FIG. 7 is a schematic diagram of initial scan points and initial scan directions of two photovoltaic strings in a second group.

The initial scan points of the two independent strings in the first group are voltage points corresponding to output powers $P_{max}$ and $P_{max}/2$, that is, two voltage operating points $V_{mp}$ and $V_1$ shown in FIG. 6. The initial scan directions of the two photovoltaic strings are a direction in which a voltage changes as an output power of each photovoltaic string decreases, that is, an arrow direction in FIG. 6. The initial scan directions of the two photovoltaic strings are a direction in which the voltage increases.

The initial scan points of the two photovoltaic strings in the second group are voltage points corresponding to output powers 0 and $P_{max}/2$, that is, two voltage operating points $V_{OC}$ and $V_1$ shown in FIG. 7. The initial scan directions of the two photovoltaic strings are a direction in which a voltage changes as an output power of each photovoltaic string increases, that is, an arrow direction in FIG. 7. The initial voltage scan directions of the two photovoltaic strings are a direction in which the voltage decreases.

It can be learned from FIG. 6 and FIG. 7 that in the solutions, initial scan points of photovoltaic strings are not the same, that is, IV curve scanning is not started from a same voltage point, and initial scan directions are also different, and scanning is performed in opposite output power change directions.

$P_{max}$ is a maximum output power of a photovoltaic string, and is affected by an operating status (a tilt angle, orientation, and aging) of the photovoltaic string at an actual power station. For example, if a maximum output power of one photovoltaic string is 1 kW, $P_{max}$ corresponding to an operating point of the string is 1 kW and if a maximum output power of another photovoltaic string is 1.2 kW, $P_{max}$ corresponding to an operating point of the string is 1.2 kW.

To ensure an effect that output powers compensate each other, a specific requirement is imposed on a time interval between scanning performed on photovoltaic strings. Specifically, when an absolute value of a power change amount of a photovoltaic string is controlled to be equal to $P_{max}/N$, an absolute value of an output power change amount of another photovoltaic string is also controlled to be equal to $P_{max}/N$, where N is a quantity of photovoltaic strings included in each group. For example, an absolute value of a power change amount of a photovoltaic string in FIG. 6 from $V_{mp}$ (a start operating point) to V1, an absolute value of a power change amount of a string in FIG. 6 from V1 (a start operating point) to $V_{OC}$, an absolute value of a power change amount of a photovoltaic string in FIG. 7 from $V_{OC}$ to V1, and an absolute value of a power change amount of a photovoltaic string in FIG. 7 from V1 to $V_{mp}$ are all $P_{max}/2$.

S403: Perform current-voltage IV curve scanning on the first group in the initial scan direction of the first group starting from output voltages corresponding to the output powers at the initial scan points of the first group, and perform current-voltage IV curve scanning on the second group in the initial scan direction of the second group starting from output voltages corresponding to the output powers at the initial scan points of the second group, where output powers of the first group and the second group are kept to compensate each other during IV curve scanning.

The foregoing steps merely determine the initial scan points and the initial scan directions. However, the output powers of the two groups need to be kept to compensate each other during the entire scanning process, that is, to maintain an output power as stable as possible and reduce a fluctuation of the output power.

To obtain an IV curve, voltages and currents at a plurality of operating points shown in FIG. 3 need to be scanned. Further, the IV curve is obtained through fitting based on output voltages and output currents, and whether a photovoltaic string is normal is determined based on the IV curve obtained through fitting.

The method provided in this embodiment is applicable to the following two groups: a first group and a second group. IV curve scanning may be performed simultaneously on photovoltaic strings in each of the two groups, but the two groups of photovoltaic strings have different scan start points, that is, different initial scan points, and the two groups of photovoltaic strings also have different initial scan directions. Output powers at initial scan points of photovoltaic strings in the first group sequentially decrease, and output powers at initial scan points of photovoltaic strings in the second group sequentially increase. In addition, an initial scan direction of the first group is a direction in which an output voltage changes as an output power decreases, and an initial scan direction of the second group is a direction in which an output voltage changes as an output power increases. Such setting is to ensure that output powers of the two groups compensate each other during IV curve scanning performed on the two groups of photovoltaic strings, that is, a total output power fluctuates slightly. This can enable an entire photovoltaic power generation system to be in a stable working status.

The foregoing technical solutions can enable IV curve scanning to be performed simultaneously on all photovoltaic strings in a photovoltaic power generation system, and IV curve scanning does not need to be performed in batches. Therefore, there is no time interval between IV curve scanning performed on different photovoltaic strings, and further there is no measurement error caused by a time interval. In addition, photovoltaic strings are grouped and paired for IV curve scanning. It can be ensured that a total output power of the photovoltaic power generation system fluctuates slightly, provided that it is ensured that powers of two groups in a pair compensate each other, that is, a fluctuation within the pair is comparatively small.

Photovoltaic strings at a power station may be grouped in a plurality of manners, and the following lists three manners.

In a first manner, the even quantity of photovoltaic strings are 2N photovoltaic strings, the 2N photovoltaic strings are divided into the first group and the second group, and each of the first group and the second group includes N photovoltaic strings.

This manner is the simplest grouping manner. That is, the photovoltaic strings are divided into only two groups, and the two groups are paired. For the converter, control is also comparatively simple. For example, a power station includes 100 photovoltaic strings, the 100 photovoltaic strings are divided into two groups, and each group includes 50 photovoltaic strings. In this case, N is 50.

For the foregoing first grouping manner, the determining output powers at initial scan points of photovoltaic strings in the first group, and determining output powers at initial scan points of photovoltaic strings in the second group is specifically:

determining the output powers that are at the initial scan points of the photovoltaic strings in the first group and that are $P_{max}$, $$\frac{(N-1)P_{max}}{N}, \ldots, \text{and } \frac{P_{max}}{N},$$

and determining the output powers that are at the initial scan points of the photovoltaic strings in the second group and that are 0, $$\frac{P_{max}}{N}, \ldots, \text{and } \frac{(N-1)P_{max}}{N},$$

where $P_{max}$ is a maximum output power corresponding to each photovoltaic string.

That is, the foregoing manner of determining the output powers that are at the initial scan points of the photovoltaic strings is consistent with manners shown in FIG. 6 and FIG. 7.

In a second manner, the even quantity of photovoltaic strings are divided into M sets, and each set is divided into an even quantity of groups.

The second grouping manner is more complicated than the first grouping manner. The photovoltaic strings are finally divided into an even quantity of groups after undergoing two-level grouping. M may be an even number or an odd number, but a final quantity of groups is an even quantity of groups. In addition, sets may include a same quantity of photovoltaic strings or different quantities of photovoltaic strings. An example in which there are 100 photovoltaic strings is still used. For example, the 100 photovoltaic strings are divided into two sets that include same photovoltaic strings, and each set includes 50 photovoltaic strings. In this case, each set is further divided into an even quantity of groups. For example, the 50 photovoltaic strings are divided into 10 groups, each group includes five photovoltaic strings, and every two groups of the 10 groups are paired. Totally, five pairs are formed. In addition, the 100 photovoltaic strings may be alternatively divided into sets that include different quantities of photovoltaic strings. For example, the 100 photovoltaic strings are still divided into two sets, where a first set includes 40 photovoltaic strings and a second set includes 60 photovoltaic strings. The first set and the second set are further divided into groups and the groups are then paired.

In a third manner, the even quantity of photovoltaic strings are divided into M sets, some of the sets are divided into subsets, each subset is divided into an even quantity of groups, and each of the remaining sets is divided into an even quantity of groups.

The third manner is more complicated than the second manner. Some sets need to be first divided into subsets and then the subsets are further divided into groups. For example, there are 100 photovoltaic strings. 10 of the 100 photovoltaic strings are directly divided into two groups. The other 90 photovoltaic strings are divided into three sets and each set includes 30 photovoltaic strings. 30 photovoltaic strings in one set are further divided into three subsets and each subset includes 10 photovoltaic strings. 10 photovoltaic strings are further divided into groups.

The foregoing merely lists three grouping manners. A grouping manner is not specifically limited in this embodiment of this application, provided that photovoltaic strings are finally divided into an even quantity of groups and pairing can be implemented. In addition, a quantity of photovoltaic strings included in each group is not limited either.

Embodiment 2

During IV curve scanning, the converter gradually changes an output voltage of a photovoltaic string to detect and record an output current and IV curve scanning needs to be performed for a complete cycle. That is, in addition to the steps shown in FIG. 4, the method further includes: when it is determined during IV curve scanning that an output voltage of each photovoltaic string is equal to an open-circuit voltage, changing a scan direction to a direction in which the output voltage decreases; when it is determined during IV curve scanning that the output voltage of each photovoltaic string is equal to a short-circuit voltage, changing the scan direction to a direction in which the output voltage increases; and when it is determined that the output voltage of each photovoltaic string is the same as the output voltage corresponding to the initial scan point and the scan direction is the same as the initial scan direction, ending IV curve scanning. The performing IV curve scanning specifically includes:

gradually changing the output voltage of the photovoltaic string, recording an output current corresponding to each output voltage, and obtaining an IV curve based on the output voltage and the corresponding output current.

The following describes a complete IV curve scanning process.

Figure 8:
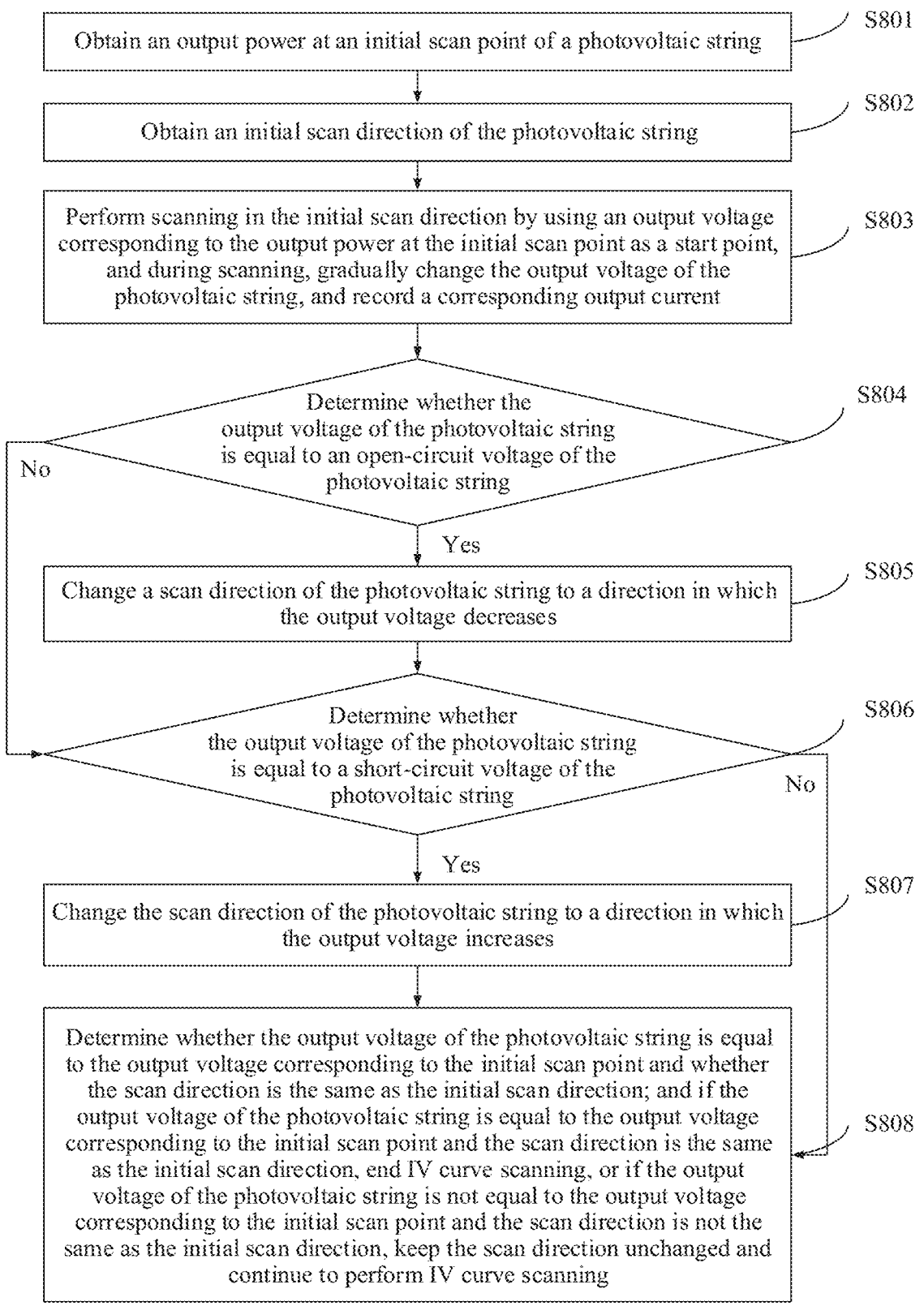
FIG. 8 is a flowchart of another IV curve scanning method according to an embodiment of this application.

FIG. 8 is a flowchart of another IV curve scanning method according to an embodiment of this application.

In Method Embodiment 1, a manner of scanning a first group and a second group in each pair has been described. The following uses any photovoltaic string in each group as an example to describe a complete process of IV curve scanning performed on the photovoltaic string.

S801: Obtain an output power at an initial scan point of the photovoltaic string.

S802: Obtain an initial scan direction of the photovoltaic string.

803: Perform scanning in the initial scan direction by using an output voltage corresponding to the output power at the initial scan point as a start point, and during scanning, gradually change the output voltage of the photovoltaic string, and record a corresponding output current.

S804: Determine whether the output voltage of the photovoltaic string is equal to an open-circuit voltage of the photovoltaic string; and if the output voltage of the photovoltaic string is equal to the open-circuit voltage of the photovoltaic string, perform S805, or if the output voltage of the photovoltaic string is not equal to the open-circuit voltage of the photovoltaic string, perform S806.

S805: Change a scan direction of the photovoltaic string to a direction in which the output voltage decreases.

S806: Determine whether the output voltage of the photovoltaic string is equal to a short-circuit voltage of the photovoltaic string; and if the output voltage of the photovoltaic string is equal to the short-circuit voltage of the photovoltaic string, perform S807, or if the output voltage of the photovoltaic string is not equal to the short-circuit voltage of the photovoltaic string, perform S808.

S807: Change the scan direction of the photovoltaic string to a direction in which the output voltage increases.

S808: Determine whether the output voltage of the photovoltaic string is equal to the output voltage corresponding to the initial scan point and whether the scan direction is the same as the initial scan direction; and if the output voltage of the photovoltaic string is equal to the output voltage corresponding to the initial scan point and the scan direction is the same as the initial scan direction, end IV curve scanning, or if the output voltage of the photovoltaic string is not equal to the output voltage corresponding to the initial scan point and the scan direction is not the same as the initial scan direction, keep the scan direction unchanged and continue to perform IV curve scanning.

In this embodiment, only a photovoltaic string is used as an example for description. After an initial scan point and an initial scan direction are determined, IV curve scanning may be started. During IV curve scanning, there are many operating points, an output voltage and an output current that are at each operating point of the photovoltaic string are recorded, and an IV curve of the photovoltaic string is obtained through fitting based on the output voltage and the output current.

Embodiment 3

During IV curve scanning, the converter gradually changes an output voltage of a photovoltaic string to detect and record an output current. The converter may change the output voltage of the photovoltaic string at a fixed voltage change rate or may change the output voltage of the photovoltaic string at a non-fixed voltage change rate.

In this embodiment, the following describes IV curve scanning that is performed in a manner in which the output voltage of the photovoltaic string is changed at a fixed voltage change rate within each IV curve scan interval. That is, the gradually changing the output voltage of the photovoltaic string is specifically:

gradually changing the output voltage of the photovoltaic string by a fixed voltage scan step within each IV curve scan interval, where the IV curve scan interval includes a voltage interval between the open-circuit voltage and a voltage corresponding to a maximum power of the photovoltaic string, and a voltage interval between the short-circuit voltage and the voltage corresponding to the maximum power of the photovoltaic string.

The following describes the IV curve scan interval with reference to an accompanying drawing.

Figure 9:
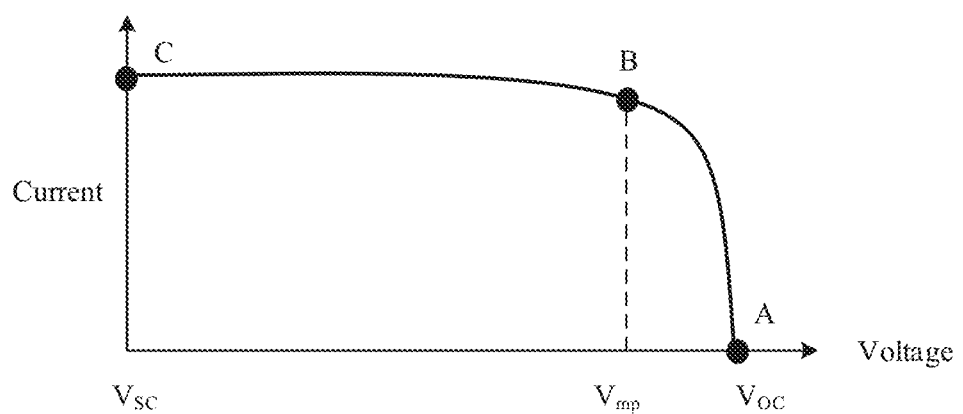
FIG. 9 is a schematic diagram of an equivalent photovoltaic string according to an embodiment of this application.

FIG. 9 is a schematic diagram of an IV curve.

A point A is an operating point corresponding to an open-circuit voltage, a point B is an operating point corresponding to a maximum output power, and a point C is an operating point corresponding to a short-circuit voltage.

It is assumed that an initial scan point is a point A, and a scan direction is a direction in which a power increases, that is, scanning is performed from A to B. In this case, an interval from A to B forms an IV curve scan interval, and an interval from B to C forms another IV curve scan interval. Voltage change rates within different IV curve scan intervals may be different, but in this embodiment, a voltage change rate within a same IV curve scan interval is the same, that is, the output voltage is changed by an equal voltage difference.

For ease of understanding of the technical solutions by a person skilled in the art, the following uses an example in which each group includes one photovoltaic string for description. A photovoltaic string in the first group is referred to as a first string, and a photovoltaic string in the second group is referred to as a second string.

Figure 10A:
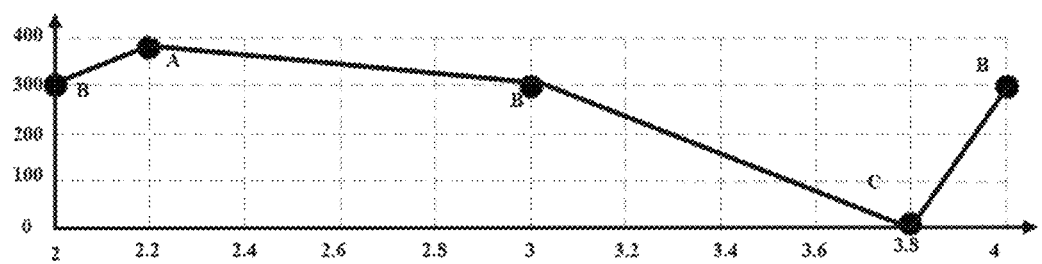
FIG. 10a is a waveform diagram of an output voltage corresponding to IV curve scanning performed on a first string according to an embodiment of this application.
Figure 10B:
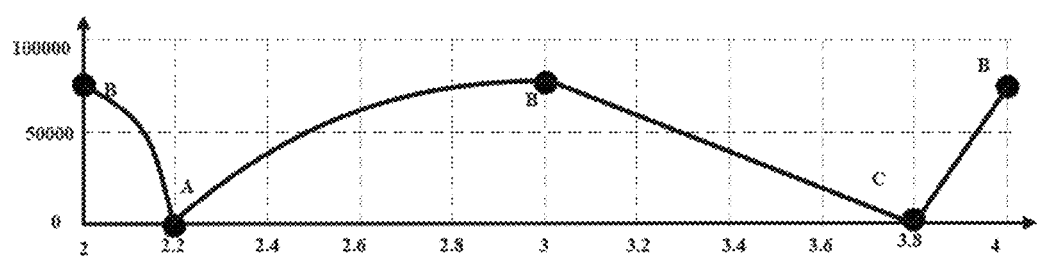
FIG. 10b is a waveform diagram of an output power corresponding to IV curve scanning performed on a first string according to an embodiment of this application.

FIG. 10a is a waveform diagram of an output voltage corresponding to IV curve scanning performed on a first string, and FIG. 10b is a waveform diagram of an output power corresponding to IV curve scanning performed on the first string.

Figure 11A:
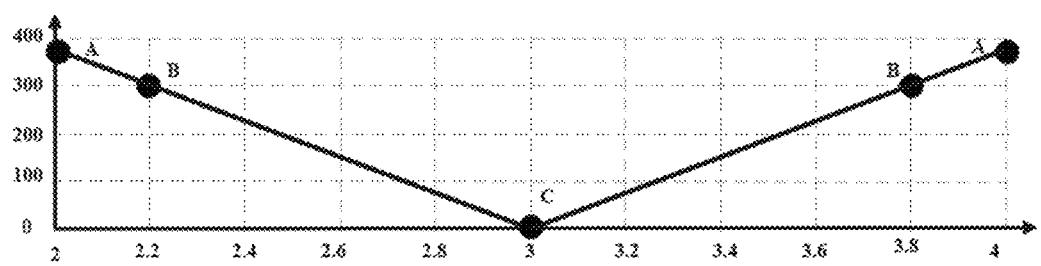
FIG. 11a is a waveform diagram of an output voltage corresponding to IV curve scanning performed on a second string according to an embodiment of this application.
Figure 11B:
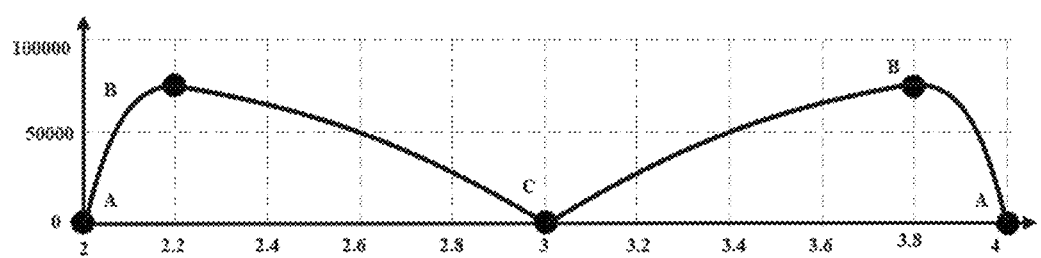
FIG. 11b is a waveform diagram of an output power corresponding to IV curve scanning performed on a second string according to an embodiment of this application.

FIG. 11a is a waveform diagram of an output voltage corresponding to IV curve scanning performed on a second string, and FIG. 11b is a waveform diagram of an output power corresponding to IV curve scanning performed on the second string.

Step 1: Converters corresponding to the first string and the second string control a corresponding photovoltaic string to be at an initial scan point of IV curve scanning.

Because each group includes only one photovoltaic string, a voltage point $V_{mp}$ corresponding to a maximum output power $P_{max}$ is controlled to be an initial scan point of the first string, for example, a point B in FIG. 10a, where a power at the point B is $P_{max}$; and for the second string, an open-circuit voltage point $V_{OC}$ is used as an initial scan point, that is, a point A in FIG. 10a, where a power at the point A is 0. A point C in FIG. 10a corresponds to a short-circuit voltage point $V_{SC}$.

Step 2: Obtain initial scan directions of IV curve scanning performed on the first string and the second string.

For the first string, B is the initial scan point, and a direction in which the voltage changes as the output power decreases is the initial scan direction, that is, a direction in which the voltage increases is the initial scan direction. For the second string, A is the initial scan point, and a direction in which the voltage changes as the output power increases is the initial scan direction, that is, a direction in which the voltage decreases is the initial direction.

Step 3: Control IV curve scanning to be performed on the first string and the second string.

The voltage of the first string is controlled to gradually change towards the operating point A, and the voltage of the second string is controlled to gradually change towards the operating point C. In addition, an output current corresponding to each operating point during the process is recorded.

Step 4: Determine whether the voltage of each string is equal to an open-circuit voltage value $V_{OC}$ or equal to a short-circuit voltage value $V_{SC}$.

When the voltage of the first string reaches the point A, that is, is equal to $V_{OC}$, a voltage change direction of the first string is set to a direction in which the voltage decreases, that is, turns back to the point B. When the voltage of the second string reaches the point B, that is, is equal to $V_{mp}$, the scan direction is not changed, and the voltage continues to decrease and changes towards the point C.

Step 5: Determine whether scanning is completed.

When the voltage of the first string reaches the point B along the direction in which the voltage increases and the voltage of the second string reaches the point A, scanning ends. Otherwise, step 3 is performed in a current scan direction.

According to the foregoing steps, a scan path of the first string is B-A-B-C-B, and a scan path of the second string is A-B-C-B-A.

The second string is used as a reference, and it is set that a voltage change rate of the second string remains constant during entire IV scanning.

In this embodiment, the output powers of the first string and the second string are controlled to compensate each other during IV curve scanning. To be specific, when the voltage of the second string reaches the point B, the voltage of the first string is controlled to reach the point A; when the voltage of the second string reaches the point C, the voltage of the first string is controlled to reach the point B, and so on, to ensure that whenever the output power of the second string changes by $P_{max}$, the output power of the first string also changes by $P_{max}$. In addition, a voltage change rate of the first string within each interval remains unchanged.

In FIG. 10a, when the voltage of the first string changes from the point B to the point A or changes from the point A to the point B, a voltage change rate within each IV curve scan interval remains unchanged. By comparing FIG. 10 with FIG. 11, it is found that when the voltage of the second string is at the point A (the output power is 0), the voltage of the first string is at the point B (the output power is $P_{max}$), and when the voltage of the second string is at the point B, the voltage of the first string is at the point A or the point C. Therefore, total output powers of the two strings compensate each other at the foregoing several operating points. In this way, a fluctuation of a total output power can be reduced.

Different IV curve scan paths are set for the two strings, so that when IV curve scanning is performed on the two strings, a moment at which either string outputs a maximum power corresponds to a moment at which the other string outputs a zero power, thereby reducing a fluctuation of a total output power of the two strings.

Embodiment 4

In the foregoing embodiment, the foregoing describes scanning during which a voltage change rate remains constant within each IV curve scan interval, and the scanning may be referred to as linear scanning. The following describes scanning during which a voltage change rate changes within each IV curve scan interval, and the scanning may be referred to as non-linear scanning. The following still uses an example in which each of two groups includes one photovoltaic string for description.

To improve an effect that output powers of the two strings compensate each other, Method Embodiment 3 is further improved. Steps in overall execution are also the same as those in Method Embodiment 3. An operating manner of the second string is the same as that in Method Embodiment 3, and specific waveforms are shown in FIG. 11. A scan path of the first string is also the same as that in Method Embodiment 3. An only difference is that a voltage scan step within each IV curve scan interval is not fixed and the voltage scan step of the first string is adjusted by using a method that enables an output power of the first string and an output power of the second string to compensate each other.

The second group is used as a reference group, and the gradually changing the output voltage of the photovoltaic string is specifically:

comparing a total output power $P_o$ of the first group and the second group with a specified power reference value $P_{ref}$, to obtain a power comparison result, where $P_{ref}$ is equal to $XP_{max}$, X is a quantity of photovoltaic strings in the reference group, and $P_{max}$ is a maximum power of a single photovoltaic string in the reference group; and adjusting a voltage scan step based on the power comparison result to change the output voltage of the photovoltaic string, to enable $P_o$ to keep consistent with $P_{ref}$.

Parameters of photovoltaic strings in each group are consistent. For example, maximum powers should be equal in an ideal case. If a fluctuation exists, it is possible that a fluctuation between maximum output powers of the photovoltaic strings is within a preset range.

The total output power $P_o$ of the two groups may be obtained by using a third-party measurement apparatus and sent to the converter of the first group. Alternatively, the converter of the second group may directly send an output power of a corresponding photovoltaic string to the converter of the first group, and the converter of the first group obtains the total output power $P_o$. This is not specifically limited in this embodiment. When each of the two groups includes one photovoltaic string, a total output power is $P_{max}$, that is, X=1.

The following specifically describes how to adjust a voltage scan step of each photovoltaic string in the first group to enable an output power of the first group and an output power of the second group to better compensate each other. The adjusting a voltage scan step based on the power comparison result to change the output voltage of the photovoltaic string specifically includes the following.

When $P_o$ is greater than $P_{ref}$, if it is determined that a power change direction of each photovoltaic string in the first group is an increasing direction, decrease the voltage scan step of each photovoltaic string in the first group, or if the power change direction is a decreasing direction, increase the voltage scan step of each photovoltaic string in the first group.

When $P_o$ is greater than $P_{ref}$ and the power change direction is the increasing direction, power increasing needs to be slowed down or paused. Therefore, the voltage scan step needs to be decreased, that is, to decrease a voltage change rate. The output power is indirectly adjusted by directly adjusting the output voltage.

When $P_o$ is less than $P_{ref}$, if it is determined that a power change direction of each photovoltaic string in the first group is an increasing direction, increase a voltage scan step of each photovoltaic string in the first group, or if the power change direction is a decreasing direction, decrease a voltage scan step of each photovoltaic string in the first group.

When $P_o$ is equal to $P_{ref}$, keep a voltage scan step of each photovoltaic string in the first group unchanged.

Likewise, the first group may be alternatively used as the reference group, and the converter corresponding to the second group gradually changes the output voltage of the second group, so that the output power of the second group and the output power of the first group better compensate each other, and a fluctuation of a total power is reduced.

Figure 12A:
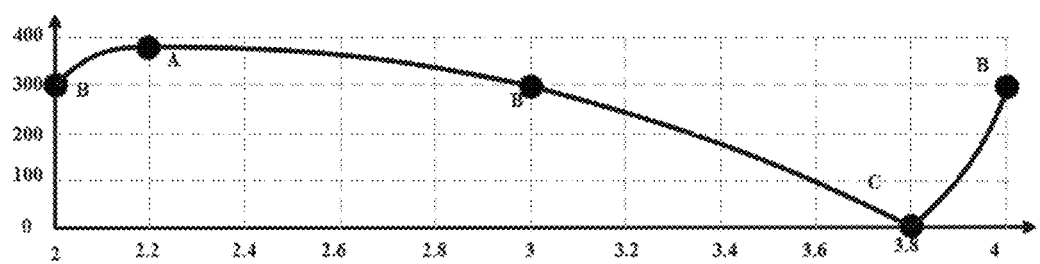
FIG. 12a is a waveform diagram of an output voltage of a first string corresponding to Method Embodiment 4 according to an embodiment of this application.
Figure 12B:
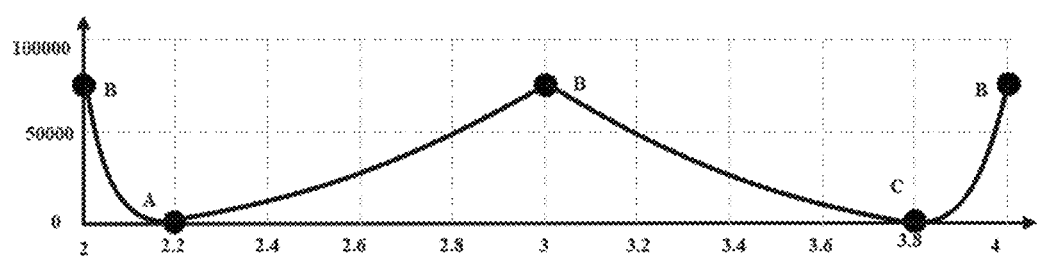
FIG. 12b is a waveform diagram of an output power of a first string corresponding to Method Embodiment 4 according to an embodiment of this application.
Figure 13:
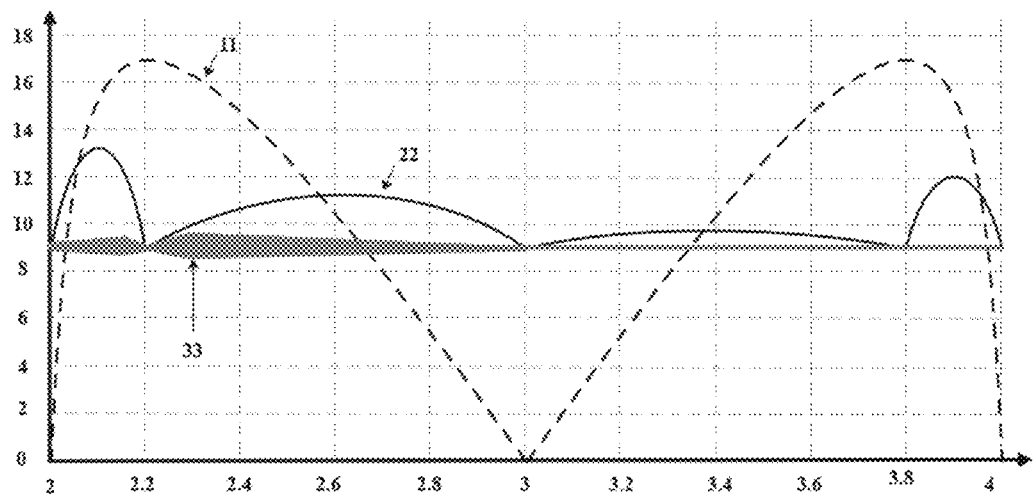
FIG. 13 is a waveform comparison diagram of total power waveforms that are obtained by using different methods according to an embodiment of this application.

By comparing FIG. 12a with FIG. 10a and comparing FIG. 12b with FIG. 10b, it can be learned that the voltage change rate of the first string in this embodiment is not fixed, changes with time, and presents an arc-shaped characteristic; and a power change of the first string shown in FIG. 12 and a power change of the second string shown in FIG. 11b better compensate each other. Total power waveforms in different embodiments are compared, as shown in FIG. 13.

If both the two strings use a conventional IV curve scan manner, that is, use a same scan path, both output powers of the two strings are shown in FIG. 11b. In this case, the total output power corresponds to a non-mutual-compensation detection method indicated by a line 11 in FIG. 13. The total output power of the two strings in Method Embodiment 3 corresponds to a linear mutual-compensation detection method indicated by a line 22 in FIG. 13, and the total output power in Method Embodiment 4 corresponds to a non-linear mutual-compensation detection method indicated by a line 33 in FIG. 13.

Although all the foregoing methods can enable complete IV curve scanning (that is, including a round-trip voltage operation point path from the point A to the point C) to be performed on two independent strings within a same unit detection time, a power fluctuation caused when the existing non-mutual-compensation detection method is used is quite large, and is a sum of respective maximum powers of the two strings. When the method in Method Embodiment 3 is used, a fluctuation of a total power can be suppressed to some extent, and a peak-to-peak power is 27% of that existing when the non-mutual-compensation detection method is used. When the method in Method Embodiment 4 is used, a fluctuation of a total power can be basically eliminated and a peak-to-peak total power is only 4% of that existing when the non-mutual-compensation detection method is used, thereby achieving the most significant effect.

It should be noted that all horizontal coordinates in FIG. 10a to FIG. 13 represent time.

According to the method provided in the foregoing embodiment, it can be ensured that within any period of time, a quantity of photovoltaic strings whose powers increase due to IV curve scanning is the same as a quantity of photovoltaic strings whose powers decrease due to IV curve scanning. Therefore, power increasing trends of some photovoltaic strings and power decreasing trends of other strings compensate each other, thereby reducing a fluctuation of a total output power, avoiding an occurrence of a supply-demand imbalance in a photovoltaic power generation system, and ensuring safe and stable operation of the photovoltaic power generation system. In addition, all photovoltaic strings at a power station do not need to be scanned in batches. This can avoid an impact of a weather change on IV curve scan data of different photovoltaic strings and improve precision of the IV curve scan data.

Embodiment of a Converter

Based on the current-voltage curve scanning method for a photovoltaic string provided in the foregoing embodiments, an embodiment of this application further provides a converter. The following describes the converter in detail with reference to an accompanying drawing.

Figure 14:
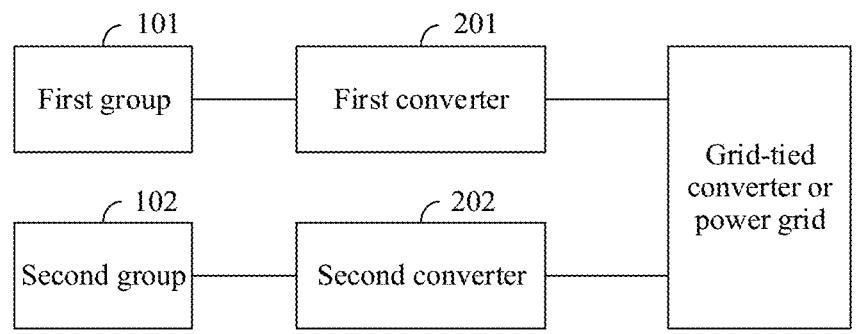
FIG. 14 is a schematic diagram of a connection between a converter and a photovoltaic string according to an embodiment of this application.

FIG. 14 is a schematic diagram of a connection between a converter and a photovoltaic string according to an embodiment of this application.

An input end of each converter in this embodiment is connected to one photovoltaic string and the converter is configured to control an output voltage of the connected photovoltaic string. The photovoltaic power generation system includes an even quantity of photovoltaic strings. The even quantity of photovoltaic strings are divided into an even quantity of groups, every two groups of the even quantity of groups are paired and each pair includes a first group and a second group. As shown in FIG. 14, only two converters corresponding to one pair are shown: a first converter 201 and a second converter 202. The first group 101 corresponds to the first converter and the second group 102 corresponds to the second converter 202. The first group 101 and the second group 102 include a same quantity of photovoltaic strings and may include a plurality of photovoltaic strings or may include one photovoltaic string.

The first converter 201 is configured to: obtain output powers at initial scan points of photovoltaic strings in the first group 101; control the output powers at the initial scan points of the photovoltaic strings in the first group 101 to sequentially decrease; and perform current-voltage IV curve scanning on the first group 101 in an initial scan direction of the first group 101 starting from output voltages corresponding to the output powers at the initial scan points of the first group 101.

The second converter 202 is configured to: obtain output powers at initial scan points of photovoltaic strings in the second group 102: control the output powers at the initial scan points of the photovoltaic strings in the second group 102 to sequentially increase; and perform current-voltage IV curve scanning on the second group 102 in an initial scan direction of the second group 102 starting from output voltages corresponding to the output powers at the initial scan points of the second group 102, where output powers of the first group 101 and the second group 102 are kept to compensate each other during IV curve scanning.

The converter and the photovoltaic string are in a one-to-one relationship, including that the photovoltaic string connected to the input end of the converter is a single photovoltaic string, or the input end of the converter is connected to an equivalent string, where the equivalent string may be a plurality of photovoltaic strings connected in parallel. To be specific, if a plurality of photovoltaic strings are connected in parallel and then are connected as a whole to a same converter, the plurality of photovoltaic strings connected in parallel are equivalent to one photovoltaic string in this embodiment of this application.

The foregoing steps merely determine the initial scan points and the initial scan directions. However, the output powers of the two groups need to be kept to compensate each other during the entire scanning process, that is, to maintain an output power as stable as possible and reduce a fluctuation of the output power.

To obtain an IV curve, voltages and currents at a plurality of operating points shown in FIG. 3 need to be scanned. Further, the IV curve is obtained through fitting based on output voltages and output currents and whether a photovoltaic string is normal is determined based on the IV curve obtained through fitting.

Two converters in each pair may simultaneously perform IV curve scanning on their corresponding groups, but the two groups of photovoltaic strings have different scan start points, that is, different initial scan points, and the two groups of photovoltaic strings also have different initial scan directions. Output powers at initial scan points of photovoltaic strings in a first group sequentially decrease and output powers at initial scan points of photovoltaic strings in a second group sequentially increase. In addition, an initial scan direction of the first group is a direction in which an output voltage changes as an output power decreases and an initial scan direction of the second group is a direction in which an output voltage changes as an output power increases. Such setting is to ensure that output powers of the two groups compensate each other during IV curve scanning performed on the two groups of photovoltaic strings, that is, a total output power fluctuates slightly. This can enable an entire photovoltaic power generation system to be in a stable working status. The foregoing technical solutions can enable IV curve scanning to be performed simultaneously on all photovoltaic strings in a photovoltaic power generation system and IV curve scanning does not need to be performed in batches. Therefore, there is no time interval between IV curve scanning performed on different photovoltaic strings, and further there is no measurement error caused by a time interval. In addition, photovoltaic strings are grouped and paired for IV curve scanning. It can be ensured that a total output power of the photovoltaic power generation system fluctuates slightly, provided that it is ensured that powers of two groups in a pair compensate each other, that is, a fluctuation within the pair is comparatively small.

During IV curve scanning, the converter gradually changes an output voltage of a photovoltaic string to detect and record an output current and IV curve scanning needs to be performed for a complete cycle. Therefore, the first converter and the second converter are further configured to: when it is determined during IV curve scanning that an output voltage of each photovoltaic string is equal to an open-circuit voltage, change a scan direction to a direction in which the output voltage decreases; when it is determined during IV curve scanning that the output voltage of each photovoltaic string is equal to a short-circuit voltage, change the scan direction to a direction in which the output voltage increases; and when it is determined that the output voltage of each photovoltaic string is the same as the output voltage corresponding to the initial scan point and the scan direction is the same as the initial scan direction, end IV curve scanning; and the performing, by the first converter and the second converter, IV curve scanning specifically includes:

gradually changing the output voltage of the photovoltaic string, recording an output current corresponding to each output voltage, and obtaining an IV curve based on the output voltage and the corresponding output current.

During IV curve scanning, the converter gradually changes an output voltage of a photovoltaic string to detect and record an output current. The converter may change the output voltage of the photovoltaic string at a fixed voltage change rate, or may change the output voltage of the photovoltaic string at a non-fixed voltage change rate.

In this embodiment, the following describes IV curve scanning that is performed in a manner in which the output voltage of the photovoltaic string is changed at a fixed voltage change rate within each IV curve scan interval. That is, the gradually changing, by the first converter and the second converter, the output voltage of the photovoltaic string is specifically: gradually changing the output voltage of the photovoltaic string by a fixed voltage scan step within each IV curve scan interval, where the IV curve scan interval includes a voltage interval between the open-circuit voltage and a voltage corresponding to a maximum power of the photovoltaic string, and a voltage interval between the short-circuit voltage and the voltage corresponding to the maximum power of the photovoltaic string.

The foregoing describes scanning during which a voltage change rate remains constant within each IV curve scan interval, and the scanning may be referred to as linear scanning. The following describes scanning during which a voltage change rate changes within each IV curve scan interval and the scanning may be referred to as non-linear scanning. The following still uses an example in which each of two groups includes one photovoltaic string for description.

To improve an effect that output powers of two strings compensate each other, a voltage scan step within each IV curve scan interval is not fixed, and a voltage scan step of a first string is adjusted in a manner that enables an output power of the first string and an output power of a second string to compensate each other.

The second group is used as a reference group, and the gradually changing, by the first converter, the output voltage of the photovoltaic string is specifically:

comparing a total output power $P_o$ of the first group and the second group with a specified power reference value $P_{ref}$, to obtain a power comparison result, where $P_{ref}$ is equal to $XP_{max}$, X is a quantity of photovoltaic strings in the reference group, and $P_{max}$ is a maximum power of a single photovoltaic string in the reference group; and adjusting a voltage scan step based on the power comparison result to change the output voltage of the photovoltaic string, to enable $P_o$ to keep consistent with $P_{ref}$.

Likewise, the first group may be alternatively used as the reference group, and the second converter gradually changes the output voltage of the photovoltaic string corresponding to the second converter, so that the output power of the second group and the output power of the first group better compensate each other, and a fluctuation of a total power is reduced.

The adjusting, by the first converter, a voltage scan step based on the power comparison result to change the output voltage of the photovoltaic string specifically includes:

when $P_o$ is greater than $P_{ref}$, if it is determined that a power change direction of each photovoltaic string in the first group is an increasing direction, decreasing a voltage scan step of each photovoltaic string in the first group, or if the power change direction is a decreasing direction, increasing a voltage scan step of each photovoltaic string in the first group;

when $P_o$ is less than $P_{ref}$, if it is determined that a power change direction of each photovoltaic string in the first group is an increasing direction, increasing a voltage scan step of each photovoltaic string in the first group, or if the power change direction is a decreasing direction, decreasing a voltage scan step of each photovoltaic string in the first group; or when $P_o$ is equal to $P_{ref}$, keeping a voltage scan step of each photovoltaic string in the first group unchanged.

For information about specific grouping of photovoltaic strings, refer to a description in Method Embodiment 1, and details are not described herein again.

For example, the even quantity of photovoltaic strings are 2N photovoltaic strings, the 2N photovoltaic strings are divided into the first group and the second group, and each of the first group and the second group includes N photovoltaic strings.

When the 2N photovoltaic strings are divided into the first group and the second group, the first converter determines that the output powers at the initial scan points of the photovoltaic strings in the first group are $P_{max}$, $$\frac{(N-1)P_{max}}{N}, \ldots, \text{and } \frac{P_{max}}{N};$$

and the second converter determines that the output powers at the initial scan points of the photovoltaic strings in the second group are 0.

$$\frac{P_{max}}{N}, \ldots, \text{and } \frac{(N-1)P_{max}}{N},$$

where $P_{max}$ is a maximum output power corresponding to each photovoltaic string.

To ensure an effect that output powers compensate each other, a specific requirement is imposed on a time interval between scanning performed on photovoltaic strings. Specifically, when an absolute value of a power change amount of a photovoltaic string is controlled to be equal to $P_{max}/N$, an absolute value of an output power change amount of another photovoltaic string is also controlled to be equal to $P_{max}/N$, where N is a quantity of photovoltaic strings included in each group.

It should be noted that the converter in the foregoing embodiment may be a DC-DC converter, or may be a DC-AC converter (that is, an inverter). A connection relationship of an output end of a converter is not specifically limited in this embodiment of this application. The following specifically describes several connection relationships of an output end of a converter.

Figure 15:
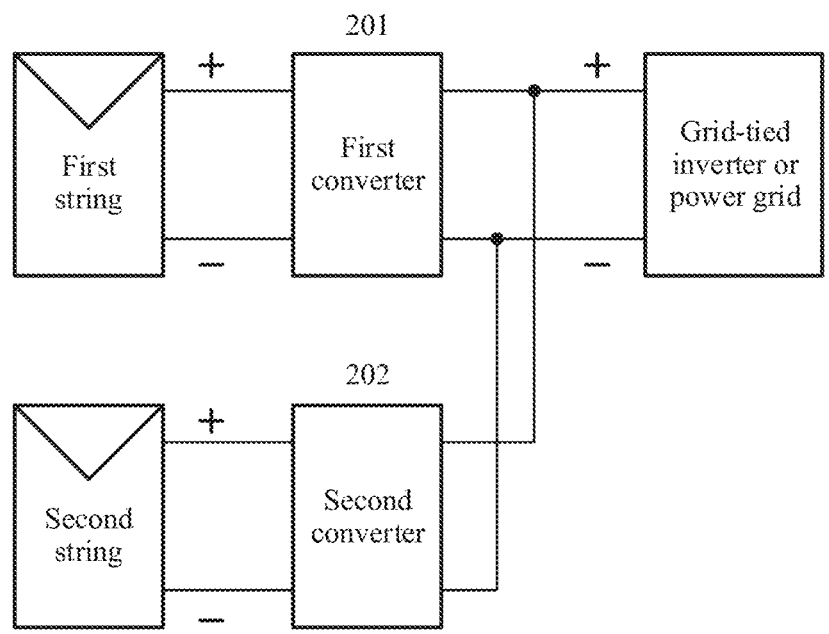
FIG. 15 is a schematic diagram of a scenario in which output ports of converters are direct-current connected in parallel according to an embodiment of this application.

First connection relationship: Output ports of converters are direct-current connected in parallel, as shown in FIG. 15.

Output ports of the first converter 201 and the second converter 202 are direct-current connected in parallel and then are connected as a whole to a same direct current bus. If there is another type of load or power supply on the direct current bus, the product implementation is a part of a direct current power grid. If there is no other type of load or power supply on the direct current bus, and the converters are connected to an alternating current power grid through a grid-tied inverter, the product implementation corresponds to a part of a string photovoltaic inverter.

Figure 16:
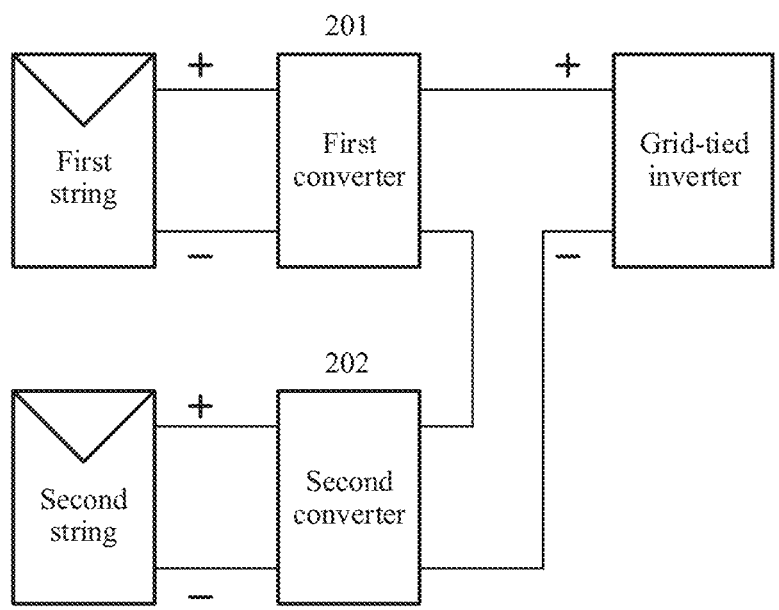
FIG. 16 is a schematic diagram of a scenario in which output ports of converters are direct-current connected in series according to an embodiment of this application.

Second connection relationship: Output ports of converters are direct-current connected in series, as shown in FIG. 16.

Output ports of the first converter 201 and the second converter 202 are direct-current connected in series to a same direct current bus, and then are connected to an alternating current power grid through a grid-tied inverter. In this case, the product implementation corresponds to an application scenario of a centralized inverter, and the converters are photovoltaic optimizers.

Figure 17:
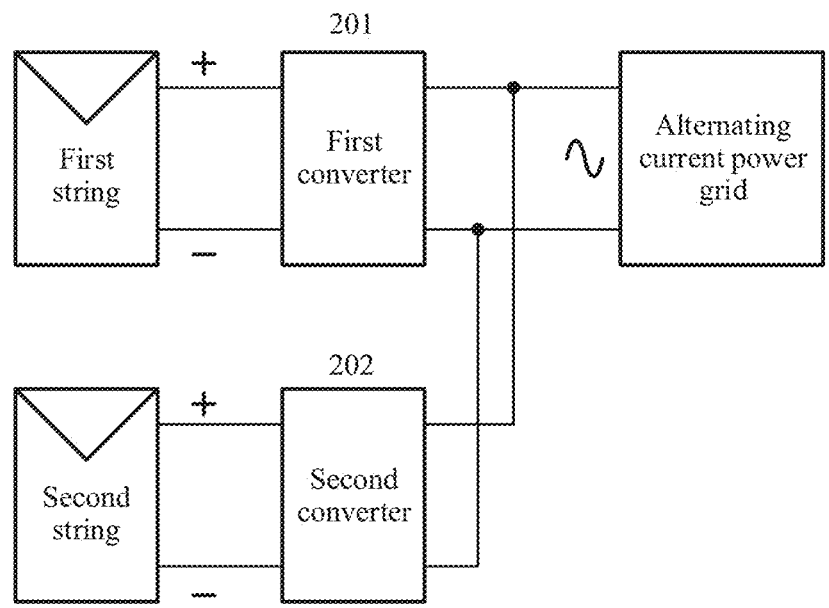
FIG. 17 is a schematic diagram of a scenario in which output ports of converters are alternating-current connected in parallel according to an embodiment of this application.

Third connection relationship: Output ports of converters are alternating-current connected in parallel, as shown in FIG. 17.

Output ports of the first converter 201 and the second converter 202 are connected in parallel and then are connected as a whole to a same alternating current bus. In this case, the product implementation corresponds to an application scenario of a photovoltaic micro inverter.

Fourth connection relationship: Output ports of converters are alternating-current connected in series, as shown in FIG. 18.

Output ports of the first converter 201 and the second converter 202 are connected in parallel to a same alternating current bus. In this case, the product implementation corresponds to an application scenario of a modular multi-level converter (MMC).

Figure 18:
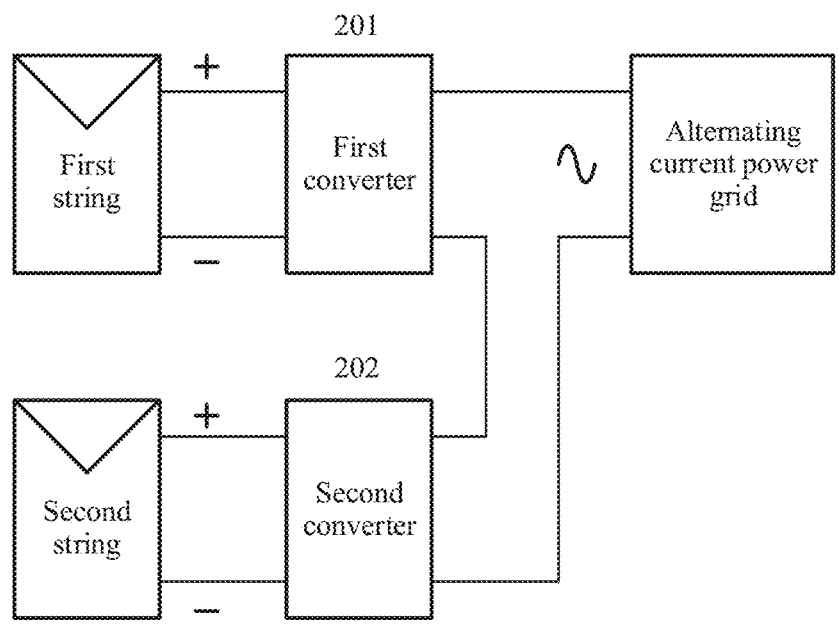
FIG. 18 is a schematic diagram of a scenario in which output ports of converters are alternating-current connected in series according to an embodiment of this application.

The converters in FIG. 15 and FIG. 16 are DC-DC converters, and the converters in FIG. 17 and FIG. 18 are DC-AC converters.

Because a photovoltaic string outputs a direct current, an input end of a converter has a direct current characteristic, and has a positive port and a negative port.

The following describes an internal structure of a converter with reference to an accompanying drawing. Converters have a similar internal structure and a same working principle. Herein, only one converter is used as an example for description.

Figure 19:
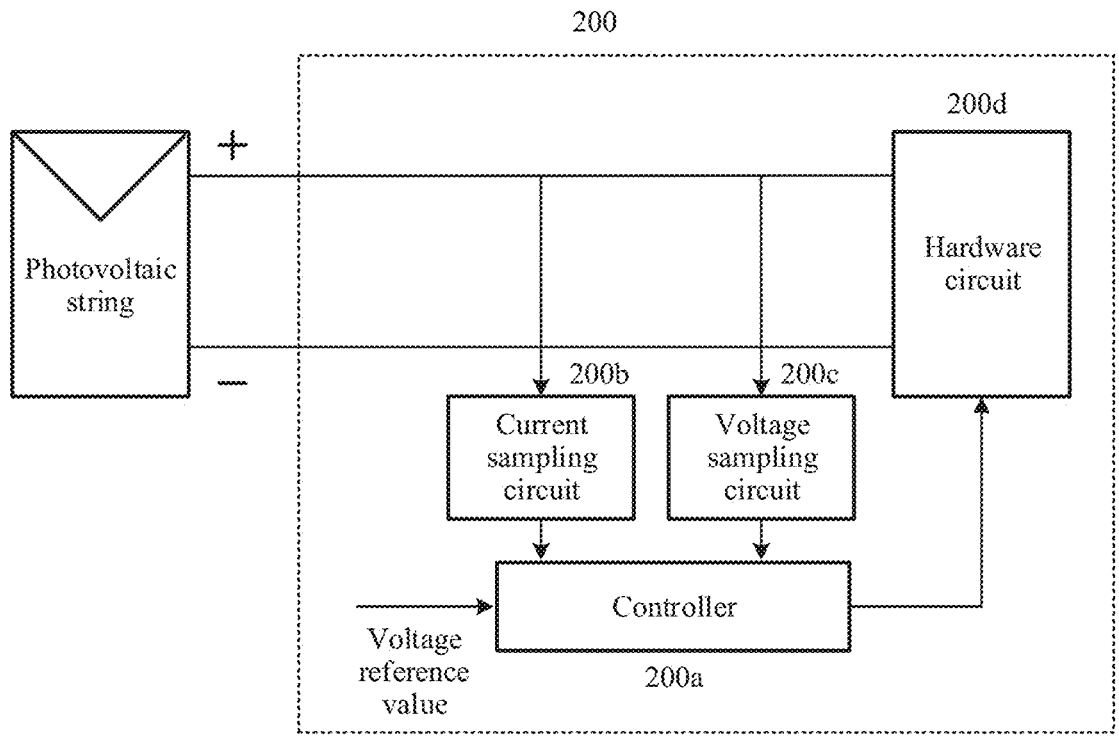
FIG. 19 is a schematic diagram of an interior of a converter according to an embodiment of this application.

FIG. 19 is a schematic diagram of an interior of a converter according to an embodiment of this application.

The converter 200 includes a controller 200a, a current sampling circuit 200b, a voltage sampling circuit 200c, and a hardware circuit 200d.

The current sampling circuit 200b and the voltage sampling circuit 200c are configured to collect an output current and an output voltage that are of a photovoltaic string, respectively, and convert the output current and the output voltage into signals that can be processed by the controller 200a.

The hardware circuit 200d includes a capacitor, an inductor, a semiconductor switch, and the like, and is configured to transmit power.

The controller 200a is configured to perform the steps in the foregoing method embodiments. In addition, the controller 200a further generates a drive signal by using a specified control loop based on a voltage reference value and the current and the voltage that are obtained through sampling, where the drive signal is used to drive the semiconductor switch in the hardware circuit 200d to be in a closed or open state.

A control objective of the controller 200a is to make an output voltage of a photovoltaic string be equal to the voltage reference value, and the controller 200a has a function of recording an output voltage and an output current that are of a photovoltaic string.

In this embodiment, converters in each pair may simultaneously control IV curve scanning to be performed on two groups of photovoltaic strings and control an output power of one group of photovoltaic strings to change in a power increasing direction and an output power of the other group of photovoltaic strings to change in a power decreasing direction, thereby reducing a fluctuation of a total output power of the pair. All converters at an entire power station are paired and simultaneously control IV curve scanning to be performed on corresponding photovoltaic strings. Therefore, there is no scan time interval, and further, a case in which detection precision is comparatively low due to a scan time interval does not occur.

Embodiment of a Photovoltaic Power Generation System

Based on the current-voltage curve scanning method for a photovoltaic string and the converter that are provided in the foregoing embodiments, an embodiment of this application further provides a photovoltaic power generation system. The following describes the photovoltaic power generation system in detail with reference to an accompanying drawing.

Figure 20:
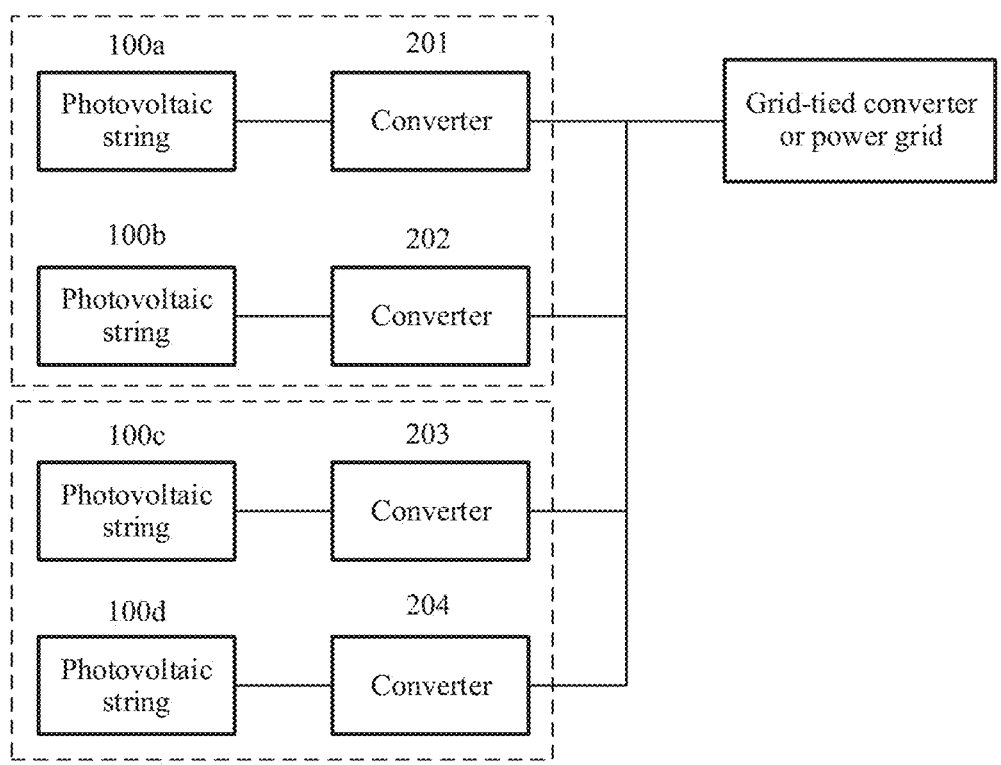
FIG. 20 is a schematic diagram of a photovoltaic power generation system according to an embodiment of this application.

FIG. 20 is a schematic diagram of a photovoltaic power generation system according to an embodiment of this application.

The photovoltaic power generation system provided in this embodiment includes the converter in the foregoing embodiment, and further includes a photovoltaic string, where the photovoltaic string is configured to convert solar energy into direct-current electric energy; and the converter is configured to perform electric energy conversion on the direct-current electric energy and transmit the converted direct-current electric energy to a downstream device.

As shown in FIG. 20, four photovoltaic strings 100a to 100d are used as an example for description. Each photovoltaic string corresponds to one converter, and the four photovoltaic strings 100a to 100d correspond to a converter 201 to a converter 204, respectively.

The photovoltaic string 100a and the photovoltaic string 100b are paired, that is, the corresponding converter 201 and converter 202 are paired. Likewise, the photovoltaic string 100c and the photovoltaic string 100d are paired, that is, the corresponding converter 203 and converter 204 are paired.

When the converters are DC-DC converters and an alternating current power grid is subsequently connected, a downstream device connected to the converters is an inverter, where the inverter is required to invert a direct current into an alternating current and feed the alternating current to the alternating current power grid. When a direct current power grid is subsequently connected, the converters may be directly connected to the direct current power grid.

When the converters are DC-AC converters and an alternating current power grid is subsequently connected, a corresponding downstream device may be a transformer.

According to the photovoltaic power generation system provided in this embodiment of this application, IV curve scanning can be performed simultaneously on all photovoltaic strings. The photovoltaic strings are divided into an even quantity of groups, every two groups are paired, and each pair uses a same control manner. For two groups in each pair, scanning starts at different initial scan points. Initial scan directions of the two groups are also different, and for the two groups, scanning is performed in opposite output power change directions. To be specific, scanning is performed for one group in a direction in which an output power increases and scanning is performed for the other group in a direction in which an output power decreases. In this way, the output powers of the two groups are kept to compensate each other during IV curve scanning, and further, a total output power of the two groups fluctuates as slightly as possible. The system can enable IV curve scanning to be performed simultaneously on all photovoltaic strings at a power station. There is no scan time interval, and therefore, a weather environment does not have an impact. Therefore, an obtained IV curve is comparatively precise.

It should be understood that in this application, "at least one (one item)" means one or more, and "a plurality of" means two or more. "and/or" is used to describe an association relationship between associated objects and indicates that three relationships may exist. For example, "A and/or B" may represent the following three cases: Only A exists, only B exists, and both A and B exist, where A and B may be singular or plural. The character "/" generally indicates an "or" relationship between the associated objects. "at least one item (one) of the following" or a similar expression thereof represents any combination of these items, including a single item or any combination of a plurality of items. For example, "at least one of a, b, or c" may represent a, b, c, "a and b", "a and c", "b and c", or "a, b, and c", where a, b, and c may be singular or plural.

The foregoing descriptions are merely preferable embodiments of this application, but are not intended to limit this application. Although the exemplary embodiments of this application are disclosed above, the embodiments are not intended to limit this application. By using the method and the technical content disclosed above, any persons of ordinary skill in the art can make a plurality of possible changes and modifications on the technical solutions of present invention, or amend the technical solutions thereof to be embodiments with equal effects through equivalent variations without departing from the protection scope of the technical solutions of present invention. Therefore, any simple modifications, equivalent variations, and modifications made to the foregoing embodiments based on the technical essence of the present invention without departing from the content of the technical solutions of the present invention still fall within the protection scope of the technical solutions of the present invention.

What is claimed is:

1. A current-voltage curve scanning method for a photovoltaic string, wherein the method is applied to a converter in a photovoltaic power generation system, and wherein the method comprises:
    obtaining output powers at initial scan points of photovoltaic strings in a first group, and obtaining output powers at initial scan points of photovoltaic strings in a second group, wherein an input end of the converter is connected to one photovoltaic string, and wherein the converter is configured to control an output voltage of the connected photovoltaic string;
    controlling the output powers at the initial scan points of the photovoltaic strings in the first group to sequentially decrease, and controlling the output powers at the initial scan points of the photovoltaic strings in the second group to sequentially increase, wherein an initial scan direction of each photovoltaic string in the first group is a direction in which an output voltage changes as an output power decreases, and wherein an initial scan direction of each photovoltaic string in the second group is a direction in which an output voltage changes as an output power increases; and
    performing current-voltage (IV) curve scanning on the first group in the initial scan direction of the first group starting from output voltages corresponding to the output powers at the initial scan points of the first group, and performing IV curve scanning on the second group in the initial scan direction of the second group starting from output voltages corresponding to the output powers at the initial scan points of the second group, wherein output powers of the first group and the second group are kept to compensate each other during IV curve scanning.

2. The method according to claim 1, further comprises:
    in response to determining that an output voltage of each photovoltaic string is equal to an open-circuit voltage during IV curve scanning, changing a scan direction to a direction in which the output voltage decreases;
    in response to determining that the output voltage of each photovoltaic string is equal to a short-circuit voltage during IV curve scanning, changing the scan direction to a direction in which the output voltage increases;
    in response to determining that the output voltage of each photovoltaic string is the same as the output voltage corresponding to the initial scan point and that the scan direction is the same as the initial scan direction, ending IV curve scanning; and
    wherein performing IV curve scanning comprises:
        gradually changing the output voltage of the photovoltaic string;
        recording an output current corresponding to each output voltage; and
        obtaining an IV curve based on the output voltage and the corresponding output current.

3. The method according to claim 2, wherein gradually changing the output voltage of the photovoltaic string comprises:
    gradually changing the output voltage of the photovoltaic string by a fixed voltage scan step within each IV curve scan interval, wherein the IV curve scan interval comprises a first voltage interval and a second voltage interval, wherein the first voltage interval is between the open-circuit voltage and a voltage corresponding to a maximum power of the photovoltaic string, wherein the second voltage interval is between the short-circuit voltage and the voltage corresponding to the maximum power of the photovoltaic string.

4. The method according to claim 2, wherein the second group is used as a reference group, wherein gradually changing the output voltage of the photovoltaic string comprises:
comparing a total output power $P_o$ of the first group and the second group with a specified power reference value $P_{ref}$ to obtain a power comparison result, wherein $P_{ref}$ is equal to $XP_{max}$, wherein X is a quantity of photovoltaic strings in the reference group, and wherein $P_{max}$ is a maximum power of a single photovoltaic string in the reference group; and
adjusting a voltage scan step based on the power comparison result to change the output voltage of the photovoltaic string, to enable $P_o$ to keep consistent with $P_{ref}$.

5. The method according to claim 4, wherein adjusting a voltage scan step based on the power comparison result to change the output voltage of the photovoltaic string comprises:
when $P_o$ is greater than $P_{ref}$:
in response to determining that a power change direction of each photovoltaic string in the first group is an increasing direction, decreasing a voltage scan step of each photovoltaic string in the first group; and
in response to determining that the power change direction is a decreasing direction, increasing a voltage scan step of each photovoltaic string in the first group;
when $P_o$ is less than $P_{ref}$:
in response to determining that a power change direction of each photovoltaic string in the first group is an increasing direction, increasing a voltage scan step of each photovoltaic string in the first group; and
in response to determining that the power change direction is a decreasing direction, decreasing a voltage scan step of each photovoltaic string in the first group; or
when $P_o$ is equal to $P_{ref}$, keeping a voltage scan step of each photovoltaic string in the first group unchanged.

6. The method according to claim 1, wherein the photovoltaic power generation system comprises an even quantity of photovoltaic strings, wherein the even quantity of photovoltaic strings are 2N photovoltaic strings, wherein the 2N photovoltaic strings are divided into the first group and the second group, and wherein each of the first group and the second group comprises N photovoltaic strings.

7. The method according to claim 6, wherein obtaining output powers at initial scan points of photovoltaic strings in a first group, and obtaining output powers at initial scan points of photovoltaic strings in a second group comprises:
obtaining the output powers that are at the initial scan points of the photovoltaic strings in the first group and that are $$\frac{(N-1)P_{max}}{N}, \ldots, \frac{P_{max}}{N};$$

and obtaining the output powers that are at the initial scan points of the photovoltaic strings in the second group and that are 0, $$\frac{P_{max}}{N}, \ldots, \frac{(N-1)P_{max}}{N},$$

wherein $P_{max}$ is a maximum output power corresponding to each photovoltaic string.

8. The method according to claim 1, wherein the photovoltaic power generation system comprises an even quantity of photovoltaic strings, wherein the even quantity of photovoltaic strings are divided into M sets, and wherein each set is divided into an even quantity, of groups.

9. The method according to claim 1, wherein the photovoltaic power generation system comprises an even quantity of photovoltaic strings, wherein the even quantity of photovoltaic strings are divided into M sets, wherein some of the sets are divided into subsets, wherein each subset is divided into an even quantity of groups, and wherein each of the remaining sets is divided into an even quantity of groups.

* * * * *

UNITED STATES PATENT AND TRADEMARK OFFICE
CERTIFICATE OF CORRECTION

| | |
|---|---|
| PATENT NO. | : 11,563,404 B2 |
| APPLICATION NO. | : 17/035142 |
| DATED | : January 24, 2023 |
| INVENTOR(S) | : Fangcheng Liu, Kai Xin and Xinyu Yu |

It is certified that error appears in the above-identified patent and that said Letters Patent is hereby corrected as shown below:

In the Claims

In Column 28, Line 12, Claim 7, after "are" insert -- $P_{max}$, --.

In Column 28, Line 35, Claim 8, delete "quantity," and insert -- quantity --.

Signed and Sealed this
Eighteenth Day of April, 2023

Katherine Kelly Vidal
*Director of the United States Patent and Trademark Office*